United States Patent
Mullins

(10) Patent No.: US 9,824,437 B2
(45) Date of Patent: Nov. 21, 2017

(54) SYSTEM AND METHOD FOR TOOL MAPPING

(71) Applicant: DAQRI, LLC, Los Angeles, CA (US)

(72) Inventor: Brian Mullins, Sierra Madre, CA (US)

(73) Assignee: DAQRI, LLC, Los Angeles, CA (US)

(*) Notice: Subject to any disclaimer, the term of this patent is extended or adjusted under 35 U.S.C. 154(b) by 94 days.

(21) Appl. No.: 14/966,666

(22) Filed: Dec. 11, 2015

(65) Prior Publication Data
US 2017/0169561 A1    Jun. 15, 2017

(51) Int. Cl.
| G06K 9/00 | (2006.01) |
| G06T 7/00 | (2017.01) |
| G06T 19/00 | (2011.01) |
| G02B 27/01 | (2006.01) |
| G02B 27/00 | (2006.01) |

(52) U.S. Cl.
CPC ........ *G06T 7/0008* (2013.01); *G02B 27/0093* (2013.01); *G02B 27/0172* (2013.01); *G06T 19/006* (2013.01); *G02B 2027/014* (2013.01); *G02B 2027/0138* (2013.01); *G06T 2207/30164* (2013.01); *G06T 2219/024* (2013.01)

(58) Field of Classification Search
None
See application file for complete search history.

(56) References Cited

U.S. PATENT DOCUMENTS 8,922,590 B1 * 12/2014 Luckett, Jr. ............ G09G 5/377
                                                345/633
9,576,329 B2 * 2/2017 Frankel ................. G09G 5/003
2008/0033592 A1   2/2008 Okrongli et al.
2009/0319399 A1 * 12/2009 Resta ..................... G06Q 10/00
                                                705/28
2012/0249741 A1 * 10/2012 Maciocci ............... G06F 3/011
                                                348/46

(Continued)

FOREIGN PATENT DOCUMENTS

KR    1020120044203 A     5/2012
KR      101195446 B1     12/2012

(Continued)

OTHER PUBLICATIONS

"International Application Serial No. PCT/US2016/065943, International Search Report dated Feb. 27, 2017", 3 pgs.

(Continued)

*Primary Examiner* — Hadi Akhavannik
(74) *Attorney, Agent, or Firm* — Schwegman Lundberg & Woessner, P.A.

(57) ABSTRACT

A server receives datasets from mobile devices. Each dataset identifies a task selected in an augmented reality application of a corresponding mobile device and an identification of a tool detected at the corresponding mobile device. The server identifies tools present and absent at a dedicated tool board and compares an identification of the tools present and absent at the dedicated tool board with the tools detected at the mobile devices and the tasks identified at the mobile devices to generate a tool inventory and a tool compliance. The server generates an augmented reality content dataset for each mobile device to identify at least one of a missing tool, an incorrect tool, and a valid tool based on the tool compliance.

18 Claims, 24 Drawing Sheets

(56) References Cited

U.S. PATENT DOCUMENTS

2012/0262558 A1* 10/2012 Boger ............... G02B 27/0093
348/61

FOREIGN PATENT DOCUMENTS

| KR | 1020130067450 A | 6/2013 |
|---|---|---|
| KR | 1020150083480 A | 7/2015 |
| KR | 1020150114106 A | 10/2015 |
| WO | WO-2017100654 A1 | 6/2017 |

OTHER PUBLICATIONS

"International Application Serial No. PCT/US2016/065943, Written Opinion dated Feb. 27, 2017", 8 pgs.

* cited by examiner

SYSTEM AND METHOD FOR TOOL MAPPING

BACKGROUND

The subject matter disclosed herein generally relates to the technical field of machines that are configured to perform image processing. Specifically, the present disclosure addresses systems and methods to use head-mounted devices to identify and locate physical objects or identify the lack of physical objects or equipment in expected locations for inventory purposes.

Workers in a factory use a variety of tools to perform their specific job. However, those tools can be misplaced or lost thereby reducing the efficiency of the worker. Furthermore, unskilled workers can use the wrong tool on a machine to perform their job, which can lead to a malfunction of the machine and require costly repairs. Keeping track of an inventory of tools in a large factory is increasingly difficult as the number of workers and tools increases. Furthermore, a manual inventory process requires worker time, downtime for the items being inventoried, and becomes stale shortly after the inventory is performed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

Figure 1:
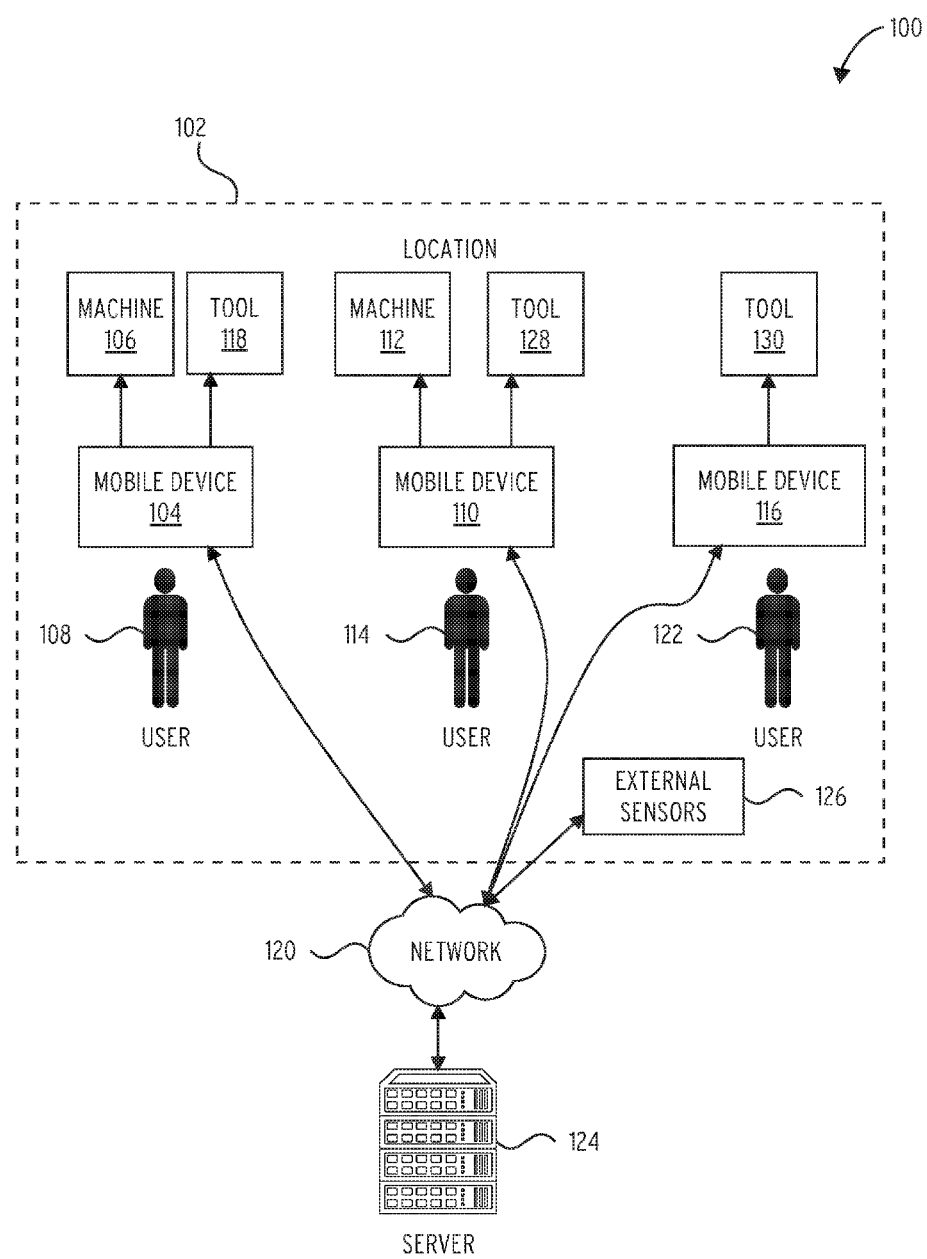
FIG. 1 is a block diagram illustrating an example of a network environment suitable for a system for tool mapping and inventory, according to some example embodiments.
Figure 2:
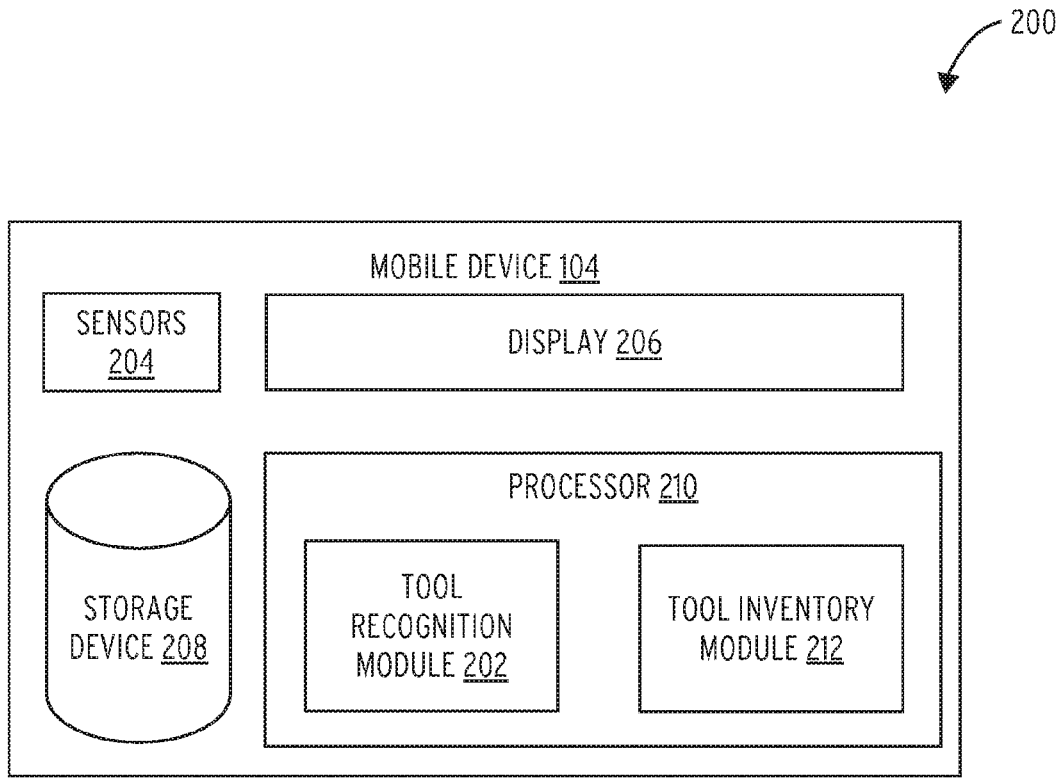
FIG. 2 is a block diagram illustrating an example embodiment of modules (e.g., components) of a mobile device.

Example methods and systems are directed to a live inventory system based on sensors in multiple mobile devices at a physical location. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Maintaining an inventory of mobile tools (e.g., hammers, movable production or service equipment) in a large factory can be increasingly difficult as the number of workers and tools increases. Sensors on head mounted devices may be used to identify and track the tools and equipment using computer vision, depth sensing, or other techniques. A dedicated tool board (e.g., a wall configured to store all the tools in the factory) may be used to further keep track of the inventory of the tools. For example, the dedicated tool board may include a board on a wall that is configured to store every tool to be used in a factory. For example, every tool has a predefined or preset storage location on the board. The board may further include an outline of a shape of a tool so as to further guide the placement of a tool in a correct location. Therefore, a user may be able to identify the status of tools by looking at the dedicated tool board and identifying which tools are present and which are not.

In one example embodiment, wearable mobile computing devices (e.g., head mounted devices) located at different locations throughout a factory send sensor data to a server that uses the sensor data to determine and identify which tools are present at the corresponding locations or the head mounted devices. The server further receives an identification of the task selected in an augmented reality application in the corresponding head mounted device. The task may be, for example, replacing a filter of a machine. The augmented reality application includes a specific dataset that includes virtual objects to guide and instruct the user of the head mounted device on how to perform the task (e.g., replace the filter).

The server determines which tools are required for the task being completed by the user of the head mounted device. The server uses the sensor data from the head mounted devices and the identification of tools present or absent at the location of each head mounted device to: (1) identify misplaced tools; (2) identify when tools are missing from the dedicated tool board; (3) cross-reference tools with task management systems of the augmented reality applications to notify head mounted device users if they do not have the appropriate tools, or where to find the appropriate tools (e.g., use wrench type H located on the dedicated tool board, go talk to user x of head mounted device y who has the correct wrench type H, wrench type H is located in corner X of the warehouse).

Furthermore, the server generates augmented reality datasets for the corresponding head mounted devices to display the correct tool (e.g., virtual object showing the correct tool). The server also generates a dedicated tool board augmented reality dataset that displays an image of the user on the corresponding tool storage location on the dedicated tool board to show which user is using the tool. Other virtual objects may be displayed to show which tool goes with which user. Additional augmented reality datasets may be used or generated to direct the user to the location of the tool.

In another example embodiment, this method can not only identify tools on a tool board, it can also identify tools in open space. This allows for:

Cross referencing tools in open space with tools missing on the inventory board to notify a user when they are in close proximity to a tool missing from the board so they can retrieve it and place it back on the dedicated tool board.

Generation of 3D geometry of objects/tools based on prior 2D, video, and/or depth captures or synthesis of any combination thereof.

Being able to localize a tool in open space and direct a user to the location of that tool based on the location of the user when the user needs to retrieve it and take it to the correct location, to the user assigned to a particular task that needs that tool, or even to leave the tool in a specific spot optimized for the next user to pick it up for a task requiring that tool.

Passively identifying tools and their location without requiring the user to actively tell the system to identify a tool or perform inventory.

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over suitable circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following embodiments describe various example embodiments of methods, machine-readable media, and systems (e.g., machines, devices, or other apparatus) discussed herein.

In some embodiment, a method includes receiving, at a server, sensor data from a plurality of mobile devices having optical sensors and location sensors, the sensor data identifying a mobile physical object and a location of the mobile physical object within a predefined geographic region based on the optical and location sensors; identifying mobile physical objects that are present and absent within the predefined location based on a predefined catalog of the mobile physical objects at the predefined geographic region; and generating, at the server, a real-time inventory of the mobile physical objects at the predefined location based on the mobile physical objects that are present and absent within the predefined location, the real-time inventory including the identification of the mobile physical objects and the location of the mobile physical objects within the predefined location.

In some embodiments, a method may include receiving datasets from a group of head mounted devices, each dataset identifying a task selected in an augmented reality application of a corresponding head mounted device, an identification of a tool detected at the corresponding head mounted device, identifying tools present and absent at a dedicated tool board, the dedicated tool board configured to store tools for the tasks of the augmented reality application; comparing an identification of the tools present and absent at the dedicated tool board with the tools detected at the head mounted devices and the tasks identified at the head mounted devices to generate a tool inventory and a tool compliance, the tool inventory identifying tools absent from the dedicated tool board and detected at the corresponding head mounted devices, the tool compliance identifying whether the tool detected at the corresponding head mounted device is valid for the task selected in the augmented reality application of the corresponding head mounted device; generating an augmented reality content dataset for each head mounted device, each augmented reality content dataset; and/or generating a dedicated tool board augmented reality content dataset for the dedicated tool board based on the tool inventory.

In some embodiments, the generating an augmented reality content dataset for each head mounted device, each augmented reality content dataset may include a virtual object identifying at least one of a missing tool, an incorrect tool, and a valid tool based on the tool compliance.

In some embodiments, the dedicated tool board augmented reality content dataset may include a group of virtual objects identifying users of the head mounted devices with corresponding tools on the dedicated tool board.

In some embodiments, the dataset may further include an identification of a user for each head mounted device, an identification of a physical object within a field of view of each head mounted device.

In some embodiments, the task identifying a physical operation to perform on the physical object.

In some embodiments, the augmented reality application configured to generate virtual objects displayed in a transparent display of the corresponding head mounted device.

In some embodiments, the virtual objects may include a visual illustration of how to perform the task and how operate the tool related to the task on the physical object.

In some embodiments, the dedicated tool board may include a group of outlines displayed on the dedicated tool board, each outline corresponding to a tool on the dedicated tool board.

In some embodiments, such a method may further include using a depth sensor of a head mounted device with the dedicated tool board within a field of view of the head mounted device, to determine the tools present at the dedicated tool board and/or identifying tools absent from the dedicated tool board based depth sensor data, a shape of the outline, and a location of the outline relative to the dedicated tool board.

In some embodiments, the virtual object may include a three-dimensional model of a tool related to the task selected at the corresponding head mounted device.

In some embodiments, the virtual object may include a visual indicator to validate a tool detected at the corresponding head mounted device for the task selected at the corresponding head mounted device.

In some embodiments, the virtual object may include a visual indicator to identify the tool detected at the corresponding head mounted device as an incorrect tool for the task selected at the corresponding head mounted device.

In some embodiments, the dedicated tool board augmented reality content dataset may include, at least one of: a first virtual object identifying a user of a head mounted device corresponding to a tool absent from the dedicated tool board, a second virtual object, and/or a third virtual object identifying a user of a head mounted device corresponding to a tool present on the dedicated too board.

In some embodiments, the second virtual object may include a visual indicator linking a tool present on the dedicated tool board to the first virtual object.

In some embodiments, such a method may further include communicating the augmented reality content dataset to the corresponding head mounted device and/or causing a display of the augmented reality content dataset in a transparent display of the corresponding head mounted device.

In some embodiments, such a method may further include communicating the dedicated tool board augmented reality content dataset to a head mounted device with the dedicated tool board within a field of view of the head mounted device and/or causing a display of the dedicated tool board augmented reality content dataset in a transparent display of the head mounted device with the dedicated tool board within the field of view of the head mounted device.

DRAWINGS

FIG. 1 is a block diagram illustrating an example of a network environment suitable for a system for tool mapping and inventory, according to some example embodiments.

A network environment 100 includes mobiles 104, 110, and 116, external sensors 126, and a server 124, communicatively coupled to each other via a network 120. The mobile devices 104, 110, 116 and the server 124 may each be implemented in a computer system, in whole or in part, as described below with respect to FIG. 24.

The server 124 may be part of a network-based system. For example, the network-based system may be or include a cloud-based server system that provides additional information, such as physical tool inventory, virtual objects (e.g., 3D model), tool identification, tool location within a predefined geographic location 102, to the mobile devices 104, 110, 116. The server 124 receives sensor data from the mobile device 104, 110, 116 to identify tools present within the location 102. The server 124 generates an inventory of tools present and absent at the location 102 based on the sensor data from the mobile devices 104, 110, 116 and a predefined list of tools associated with the location 102 and/or the users 108, 114, 122. The inventory may include an identification of tools present and absent from the location 102, a location of the tools present at the location 102, users presently using the tools or associated with the tools at the location 102.

The mobile devices 104, 112, 116 each include a computing device and a display (e.g., a transparent display) that displays synthetic information in a layer added onto a field of view of the users 114, 122, 124. For example, the user 108 may aim the mobile device 104 and look at a physical machine 106 (e.g., a drill) in a real world physical environment (e.g., factory at location 102). The user 108 uses the mobile device 104 to view the machine 112 and a physical tool 128 (e.g., screwdriver). The physical tool may include a physical object not capable of communicating electronically with other computing devices such as the server 124 or the mobile device 104. The user 108, 114, 122 may be a human user (e.g., a human being), a machine user (e.g., a computer configured by a software program to interact with the mobile device 104, 110, 116), or any suitable combination thereof (e.g., a human assisted by a machine or a machine supervised by a human). The user 108, 114, 122 is not part of the network environment 100, but is associated with the mobile device 104, 110, 116. For example, the mobile device 104, 110, 116 may be a computing device with a camera and a display such as a tablet, smartphone, or a wearable computing device (e.g., head mounted device such as a helmet or glasses). In another example embodiment, the computing device may be hand held or may be removably mounted to the head of the user 108, 114, 122. In one example, the display may be a screen that displays what is captured with a camera of the mobile device 104, 112, 116. In another example, the display of the mobile device 104, 110, 116 may be transparent such as in lenses of wearable computing glasses or the visor or a face shield of a helmet.

In one example embodiment, the objects in the image generated by the mobile devices are tracked and recognized locally at the mobile devices using a local context recognition dataset or any other previously stored dataset of an augmented reality application of the mobile devices. For example, the local context recognition dataset module may include a library of virtual objects associated with real-world physical objects or references. In one example, the mobile device 104 identifies feature points in an image of the machine 106 and the tool 118. The mobile device 104 may also identify tracking data related to the machine 106 (e.g., location 102, GPS location of the mobile device 104, orientation, distance to the machine 106). If the captured image is not recognized locally at the mobile device 104, the mobile device 104 can download additional information (e.g., 3D model or other augmented data) corresponding to the captured image, from a database of the server 124 over the network 120.

In another example embodiment, the machine 106 in the image generated by the mobile device 104 is tracked and recognized remotely at the server 124 using a remote context recognition dataset or any other previously stored dataset of an AR application in the server 124. The remote context recognition dataset module may include a library of virtual objects or augmented information associated with real-world physical objects or references.

External sensors 126 may be associated with, or coupled to, related to the machines 106, 112 to measure a location, status, and characteristics of the machines 106, 112. Examples of measured readings may include and but are not limited to tool presence, weight, pressure, temperature, velocity, direction, position, intrinsic and extrinsic properties, acceleration, and dimensions. For example, external sensors 126 may be disposed throughout a factory floor (e.g., location 102) to measure movement, pressure, orientation, and temperature. The external sensors 126 can also be used to measure a location, status, and characteristics of the mobile device 104, 110, 116. The server 124 can compute readings from data generated by the external sensors 408 and generate virtual indicators such as vectors or colors based on data from external sensors 408. Virtual indicators are then overlaid on top of a live image or a view of the machine 106, 112 in a line of sight of the corresponding user to show data related to the machine 106, machine 112, tool 118, tool 128. For example, the virtual indicators may include arrows with shapes and colors that change based on real-time data. The mobile device 104, 110, 116 can render the virtual indicators in the display of the mobile devices. In another example embodiment, the virtual indicators are rendered at the server 124 and streamed to the mobile devices 104, 110, 116.

The external sensors 126 may include other sensors used to track the location, movement, and orientation of the mobile devices 104, 110, 116 externally without having to rely on sensors internal to the mobile devices. The external sensors 126 may include optical sensors (e.g., depth sensors such as structure light, time of flight), wireless sensors (Bluetooth, Wi-Fi), GPS sensors, and audio sensors to determine the location of the users 108, 114, 122, distance of the users 108, 114, 122 to the external sensors 126 (e.g., sensors placed in corners of a venue or a room), the orientation of the mobile devices 104, 110, 116 to track what the user 108 is looking at (e.g., direction at which the mobile device 104 is pointed).

In another example embodiment, data from the external sensors 408 and internal sensors in the mobile device 104 may be used for analytics data processing at the server 124 (or another server) for analysis on usage and how the user 108 is interacting with the machine 106 in the physical environment. Live data from other servers may also be used in the analytics data processing. For example, the analytics data may track at what locations (e.g., points or features) on the physical or virtual object the user 108 has looked, how long the user 108 has looked at each location on the physical or virtual object, how the user 108 positions the mobile device 104 when looking at the physical or virtual object, which features of the virtual object the user 108 interacted with (e.g., such as whether the user 108 engaged with the virtual object), and any suitable combination thereof. The mobile device 104 receives a visualization content dataset related to the analytics data. The mobile device 104 then generates a virtual object with additional or visualization features, or a new experience, based on the visualization content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 24. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 120 may be any network that enables communication between or among machines (e.g., server 124), databases, and devices (e.g., mobile devices 104, 110, 116). Accordingly, the network 120 may be a wired network, a wireless network (e.g., a mobile or cellular network), or any suitable combination thereof. The network 120 may include one or more portions that constitute a private network, a public network (e.g., the Internet), or any suitable combination thereof.

The mobile device 104 includes sensors 204, a display 206, a processor 210, and a storage device 208. For example, the mobile device 104 may include a computing device such as a smart phone or a tablet.

The sensors 204 include, for example, a thermometer, an infrared camera, a barometer, a humidity sensor, an EEG sensor, a proximity or location sensor (e.g, near field communication, GPS, Bluetooth, Wifi), an optical sensor (e.g., camera), an orientation sensor (e.g., gyroscope), an audio sensor (e.g., a microphone), or any suitable combination thereof. For example, the sensors 204 may include a rear facing camera and a front facing camera in the mobile device 104. It is noted that the sensors described herein are for illustration purposes and the sensors 204 are thus not limited to the ones described.

The display 206 includes, for example, a display configured to display images generated by the processor 210. In another example, the display 206 includes a touch sensitive surface to receive a user input via a contact on the touch sensitive surface.

The processor 210 includes a tool recognition module 202, and a tool inventory module 212. The tool recognition module 202 receives data from sensors 204 (e.g., receive an image of the machine 106 or the tool 118) and identifies and recognizes the machine 106/tool 118 using machine-vision recognition techniques. The tool recognition module 202 then retrieves from the storage device 208 content associated with the machine 106 and/or tool 118. In one example embodiment, the tool recognition module 202 identifies a visual reference (e.g., a logo or QR code) on the physical object (e.g., a chair) and tracks the location of the visual reference. The visual reference may also be referred to as a marker and may consist of an identifiable image, symbol, letter, number, machine-readable code disposed on the tool 118. For example, the visual reference may include a bar code, a quick response (QR) code, or an image that has been previously associated with the virtual object.

The tool inventory module 212 generates a tool inventory based on data from sensor 204 and an identification of the tools from the tool recognition module 202. For example, the tool inventory module 212 collects information related to the type of tools used at the location 102, the users associated with the tools, and the location of the tools recognized by the mobile device 104 within the location 102. Furthermore, the tool inventory module 212 compares the tools identified at the location 102 with a list of predefined tools for the location 102. For example, the list of predefined tools identifies physical tools that should be present (or absent) at the location 102, specific locations or machines associated with the physical tools, specific users associated with the tools or authorized to use certain tools, a time at which a physical tool should be present in a particular location (e.g., next to machine 106 or with a pre-specified user 108) within the location 102. The tool inventory module 212 may identify tools that are absent based on the list of predefined tools for the location 102.

The tool inventory module 212 dynamically updates an inventory of the tools present at the location 102 based on sensor data from the mobile device 104 and other mobile devices at the same location 102. For example, sensor data from the mobile devices may be collected at the server 124 to generate a real-time inventory of the tools present at the location 102.

The storage device 208 stores an identification of the sensors and their respective functions. The storage device 208 further includes a database of visual references (e.g., images, visual identifiers, features of images) and corresponding metadata (e.g., which user are allowed to use the tool, where the tool should be located within the location 102 at certain time periods, which machine within the location 102 is associated with the tool, etc). For example, the visual reference may include a machine-readable code or a previously identified image (e.g., a picture of a screwdriver).

In one embodiment, the mobile device 104 communicates over the network 120 with the server 124 to retrieve a portion of a database of visual references and corresponding metadata. The network 120 may be any network that enables communication between or among machines, databases, and devices (e.g., the mobile device 104). Accordingly, the network 120 may be a wired network, a wireless network (e.g., a mobile or cellular network), or any suitable combination thereof. The network 120 may include one or more portions that constitute a private network, a public network (e.g., the Internet), or any suitable combination thereof.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
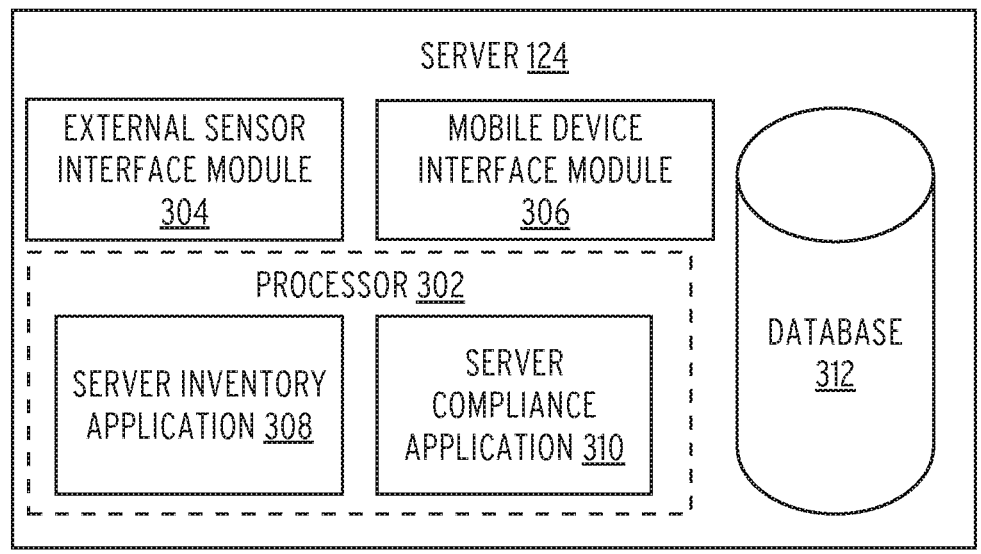
FIG. 3 a block diagram illustrating an example embodiment of a server.

FIG. 3 is a block diagram illustrating an example embodiment of a server. The server 124 includes an external sensor interface module 304, a mobile device interface module 306, a processor 302, and a database 312.

The external sensor interface module 304 is configured to communicate with the external sensors 108 to receive sensor data related to the mobile devices and the location 102. For example, the external sensor interface module 304 accesses data related to the presence and absence of the tools at the location 102.

The mobile device interface module 306 is configured to communicate with the mobile device 104, 110, 116 located within the machine 112 to receive data identifying a machine and a tool detected at the mobile device 104, a user identification of the mobile device 104, and a geographic location of the mobile device 104.

The processor 302 includes a server inventory application 308 and a server compliance application 310. The server inventory application 308 performs a real time inventory of the tools based on the data received from the external sensor interface module 304 and the mobile device interface module 306. For example, the server inventory application 308 tracks the location of tools detected within the location 102. The server inventory application 308 associates the identification of each tool with their corresponding location (e.g., screwdriver type B is with mobile device 110, wrench type C is with mobile device 116).

The server compliance application 310 determines a compliance of the mobile device 104, 110, 116 based on their respective tasks, location, user identification, tool(s) detected at the corresponding mobile device. The server compliance application 310 determines whether the tool detected at each mobile device 104 matches the tool specified or associated with a task at the mobile device. For example, if a task for the mobile device 104 includes changing a filter of a machine x, the tool associated with that task may be a type A wrench. The server compliance application 310 detects that the user of the mobile device 104 has in his possession a type B wrench instead of the type A wrench and generates AR content within a field of view of the user 108 to warn the user 108 that he/she has the incorrect tool. The AR content may further identify where to find the correct tool (e.g., another user has it, or the tool can be found at a specific location identified by one of the mobile devices within location 102).

The database 312 stores data received from the external sensor interface module 304 and the mobile device interface module 306, and predefined tools associated with predefined tasks. The database 312 may keep a live or real-time inventory of the location of the tools, which tool is associated with which mobile device, and which tool is associated with which task.

Figure 4:
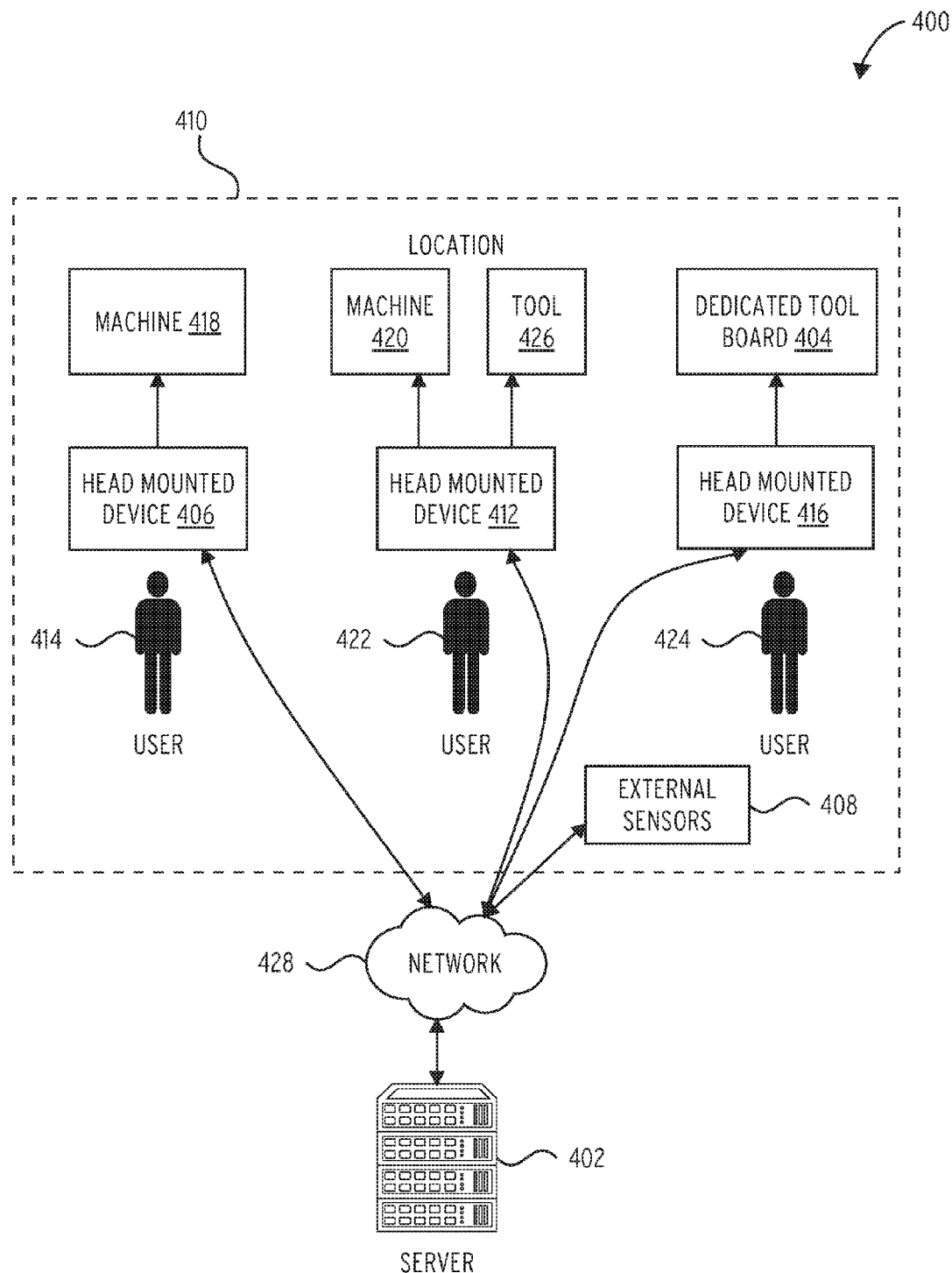
FIG. 4 is a block diagram illustrating an example of a network environment suitable for a system for tool mapping, according to some example embodiments.

FIG. 4 is a block diagram illustrating an example of a network environment suitable for a system for tool mapping, according to some example embodiments.

A network environment 400 includes head mounted devices 406, 412, and 416, external sensors 408, and a server 402, communicatively coupled to each other via a network 428. The head mounted devices 406, 412, 416 and the server 402 may each be implemented in a computer system, in whole or in part, as described below with respect to FIG. 24.

The server 402 may be part of a network-based system. For example, the network-based system may be or include a cloud-based server system that provides additional information, such as 3D models or other virtual objects, to the head mounted devices 406, 412, 416.

The head mounted devices 406, 412, 416 each include a computing device and a transparent display that displays synthetic information in a layer added onto a field of view of the users 414, 422, 424. For example, a user 414 wear the head mounted device 406 and look at a machine 418 (e.g., a drill) in a real world physical environment (e.g., factory at location 410). A user 422 uses the head mounted device 412 to view the machine 420 and a tool 426 e.g., screwdriver). A user 424 uses the head mounted device 416 to view a dedicated tool board 404. The dedicated tool board 404 may be a central storage facility for all tools within the location 410. In one example embodiment, users 414, 422, 424 abide by a system or standard that all tools used within the location 410 are to be stored backed at the dedicated tool board 404 after their use.

The users 414, 422, 424 may be a human user (e.g., a human being), a machine user (e.g., a computer configured by a software program to interact with the head mounted device 406, 412, 416), or any suitable combination thereof (e.g., a human assisted by a machine or a machine supervised by a human). The users 414, 422, 424 are not part of the network environment 400, but are associated with the head mounted device 406, 412, 416. For example, the head mounted device 406 may be a computing device with a camera and a transparent display such as a wearable computing device (e.g., helmet or glasses). In another example embodiment, the computing device may be hand held or may be removably mounted to the head of the users 414, 422, and 424. In one example, the display in the head mounted device 406 may be a screen that displays what is captured with a camera of the head mounted device 406, 412, 416. In another example, the display of the head mounted device 406, 412, 416 may be transparent such as in lenses of wearable computing glasses or the visor or a face shield of a helmet.

The user 414 may be a user of an AR application in the head mounted device 406 and at the server 402. The AR application may provide the user 414 with an AR experience triggered by identified objects (e.g., machine 418) in the physical environment. For example, the machine 418 includes identifiable objects such as a 2D physical object (e.g., a picture), a 3D physical object (e.g., a factory machine), a location (e.g., at the bottom floor of a factory), or any references (e.g., perceived corners of walls or furniture) in the real world physical environment. The AR application may include computer vision recognition to determine corners, objects, lines, letters, etc.

The AR applications allow a user to experience information, such as in the form of a virtual object (e.g., a three-dimensional model of a virtual dinosaur) overlaid on an image of a real world physical object (e.g., a billboard) captured by a camera of a viewing device. The viewing device may include a handheld device such as a tablet or smartphone, or a wearable device such as a head mounted device (HMD) (e.g., helmet, glasses). The virtual object may be displayed in a transparent or clear display (e.g., see-through display) of the viewing device. The physical object may include a visual reference (e.g., uniquely identifiable pattern on a physical object) that the AR application can recognize. A visualization of the additional information, such as the virtual object overlaid or engaged with an image of the physical object is generated in the display of the viewing device. The viewing device generates the virtual object based on the recognized visual reference (e.g., QR code) or captured image of the physical object (e.g, image of a logo). The viewing device displays the virtual object based on a relative position between the viewing device and the visual reference. For example, a virtual dinosaur appears closer and bigger when the viewing device is held closer to the visual reference associated with the virtual dinosaur. Similarly, the virtual dinosaur appears smaller and farther when the viewing device is moved further away from the virtual reference associated with the virtual dinosaur. The virtual object may include a three-dimensional model of a virtual object or a two-dimensional model of a virtual object. For example, the three-dimensional model includes a three-dimensional view of a chair. The two-dimensional model includes a two-dimensional view of a dialog box, menu, or written information such as statistics information for a baseball player. The viewing device renders an image of the three-dimensional or two-dimensional model of the virtual object in the display of the viewing device.

In one example embodiment, the AR application includes several tasks or operations for the user to perform with respect to the machine 418. For example, one task may be cleaning the machine 418. Another task may be changing a component (e.g., filter) of the machine 418. The user 414 may select the task from a menu of task from the AR application. In another example, the task may be already pre-assigned to the user 414. For example, the server 402 assigns a task of cleaning the machine 418 to the user 414 every Monday morning or upon other configurable triggers.

In one example embodiment, the objects in the image are tracked and recognized locally in the head mounted device 406 using a local context recognition dataset or any other previously stored dataset of the AR application of the head mounted device 406. The local context recognition dataset module may include a library of virtual objects associated with real-world physical objects or references. In one example, the head mounted device 412 identifies feature points in an image of the machine 420 and the tool 426. The head mounted device 412 may also identify tracking data related to the machine 420 (e.g., location 410, GPS location of the head mounted device 412, orientation, distance to the machine 420). If the captured image is not recognized locally at the head mounted device 412, the head mounted device 412 can download additional information (e.g., 3D model or other augmented data) corresponding to the captured image, from a database of the server 402 over the network 428.

In another example embodiment, the machine 420 in the image is tracked and recognized remotely at the server 402 server 124 using a remote context recognition dataset or any other previously stored dataset of an AR application in the server 124. The remote context recognition dataset module may include a library of virtual objects or augmented information associated with real-world physical objects or references.

Similarly, the head mounted device 416 identifies feature points in an image of the dedicated tool board 404 to identify which tools are present and which tools are missing from the dedicated tool board 404. The head mounted device 416 may use other techniques such as 3D mapping and depth sensing to map the tools physically present on the dedicated tool board 404. Other techniques (e.g., machine-vision algorithm) can be used to identify which tools are present on the dedicated tool board 404.

External sensors 408 may be associated with, coupled to, related to the machines 418, 420, and dedicated tool board 404 to measure a location, status, and characteristics of the machines 418, 420 and dedicated tool board 404. Examples of measured readings may include and but are not limited to tool presence, weight, pressure, temperature, velocity, direction, position, intrinsic and extrinsic properties, acceleration, and dimensions. For example, external sensors 408 may be disposed throughout a factory floor (e.g., location 410) to measure movement, pressure, orientation, and temperature. The external sensors 408 can also be used to measure a location, status, and characteristics of the head mounted device 406, 412, 416. The server 402 can compute readings from data generated by the external sensors 408 and generate virtual indicators such as vectors or colors based on data from external sensors 408. Virtual indicators are then overlaid on top of a live image or a view of the machine 418, 420, and dedicated tool board 404 in a line of sight of the corresponding user to show data related to the machines 418, 420, tool 426, and dedicated tool board 404. For example, the virtual indicators may include arrows with shapes and colors that change based on real-time data. The head mounted device 406, 412, 416 can render the virtual indicators in the transparent display of the corresponding head mounted device. In another example embodiment, the virtual indicators are rendered at the server 402 and streamed to the head mounted device 406, 412, 416.

The external sensors 408 may include other sensors used to track the location, movement, and orientation of the head mounted device 406, 412, 416 externally without having to rely on sensors internal to the head mounted device 406, 412, 416. The sensors may include optical sensors (e.g., depth-enabled 3D camera), wireless sensors (Bluetooth, Wi-Fi), GPS sensors, and audio sensors to determine the location of the users 414, 422, 424 wearing the head mounted device 406, 412, 416, distance of the user 114 to the external sensors 408 (e.g., sensors placed in corners of a venue or a room), the orientation of the head mounted device 406 to track what the user 414 is looking at (e.g., direction at which the head mounted device 406 is pointed, e.g., head mounted device 406 pointed towards a player on a tennis court, head mounted device 406 pointed at a person in a room).

In another example embodiment, data from the external sensors 408 and internal sensors in the head mounted device 406 may be used for analytics data processing at the server 402 (or another server) for analysis on usage and how the user 414 is interacting with the machine 418 in the physical environment. Live data from other servers may also be used in the analytics data processing. For example, the analytics data may track at what locations (e.g., points or features) on the physical or virtual object the user 414 has looked, how long the user 414 has looked at each location on the physical or virtual object, how the user 414 wore the head mounted device 406 when looking at the physical or virtual object, which features of the virtual object the user 414 interacted with (e.g., such as whether the user 414 engaged with the virtual object), and any suitable combination thereof. The head mounted device 406 receives a visualization content dataset related to the analytics data. The head mounted device 406 then generates a virtual object with additional or visualization features, or a new experience, based on the visualization content dataset.

Any of the machines, databases, or devices shown in FIG. 4 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 24. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 428 may be any network that enables communication between or among machines (e.g., server 402) databases, and devices (e.g., head mounted device 406, 412, 416). Accordingly, the network 428 may be a wired network, a wireless network (e.g., a mobile or cellular network), or any suitable combination thereof. The network 428 may include one or more portions that constitute a private network, a public network (e.g., the Internet), or any suitable combination thereof.

Figure 5:
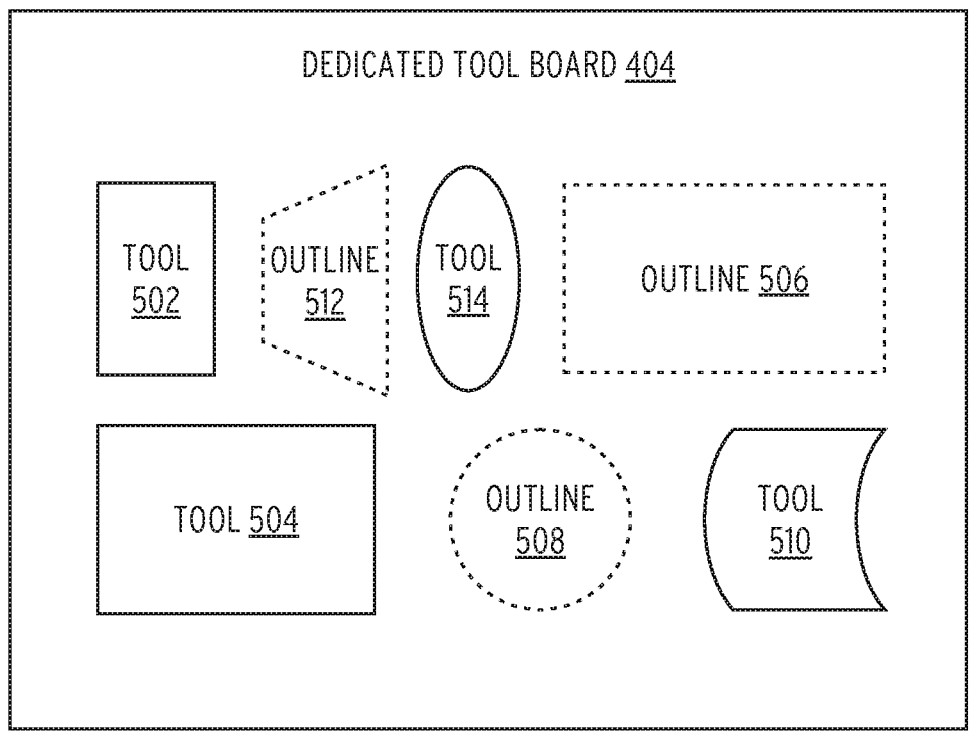
FIG. 5 is a block diagram illustrating an example of a dedicated tool board.

FIG. 5 is a block diagram illustrating an example of a dedicated tool board 404. The dedicated tool board 404 may be, for example, a physical wall having preset storage locations for the tools used at the location 410 (e.g., within a factory). Outlines or cutout shapes of the tools may visually represent where each tool is to be placed on the dedicated tool board 404.

For example, the dedicated tool board 404 includes tools (e.g., tools 502, 504, 510, and 514) that are physically placed on a vertical storage wall. Therefore tools 502, 504, 510, and 514 are present on the dedicated tool board 404. Tools that are absent or missing from the dedicated tool board 404 are identified with an outline (e.g., outlines 506, 508, and 512) or a contour shape of the respective tool on the dedicated tool board 404.

In another example embodiment, sensors may be placed on the dedicated tool board 404 to detect the presence or absence of specific tools based on their preset locations on the dedicated tool board 404.

Figure 6:
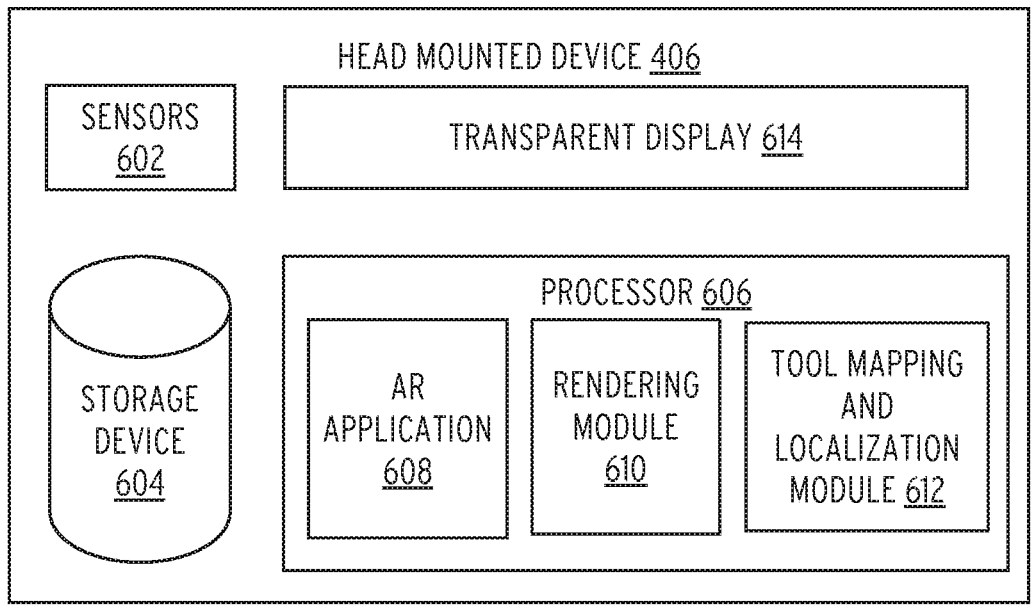
FIG. 6 is a block diagram illustrating an example embodiment of modules (e.g., components) of a head mounted device.

FIG. 6 is a block diagram illustrating an example embodiment of modules (e.g., components) of a head mounted device 406.

The head mounted device 406 includes sensors 602, a transparent display 614, a processor 606, and a storage device 604. For example, the head mounted device 406 may include a helmet, a visor, or any other device mounted to a head for the user 414.

The sensors 602 include, for example, a thermometer, an infrared camera, a barometer, a humidity sensor, an EEG sensor, a proximity or location sensor (e.g, near field communication, GPS, Bluetooth, Wifi), an optical sensor (e.g., camera), an orientation sensor (e.g., gyroscope), an audio sensor (e.g., a microphone), or any suitable combination thereof. For example, the sensors 602 may include a rear facing camera and a front facing camera in the head mounted device 406. It is noted that the sensors described herein are for illustration purposes and the sensors 602 are thus not limited to the ones described.

The transparent display 614 includes, for example, a display configured to display images generated by the processor 606. The user 414 can see through the transparent display 614. Images displayed in the transparent display 614 appear to be perceived as a layer on real world physical objects by the user 414.

The processor 606 includes an AR application 608, a rendering module 610, and a tool mapping and localization module 612. The AR application 608 receives data from sensors 602 (e.g., receive an image of the machine 418 or a physical tool) and identifies and recognizes the machine 418 using machine-vision recognition techniques. The AR application 608 then retrieves from the storage device 604 AR content associated with the machine 418. In one example embodiment, the AR application 608 identifies a visual reference (e.g., a logo or QR code) on the physical object (e.g., a chair) and tracks the location of the visual reference within the transparent display 614 of the head mounted device 406. The visual reference may also be referred to as a marker and may consist of an identifiable image, symbol, letter, number, machine-readable code. For example, the visual reference may include a bar code, a quick response (QR) code, or an image that has been previously associated with the virtual object.

The rendering module 610 renders virtual objects based on data from sensors 602. For example, the rendering module 610 renders a display of a virtual object (e.g., a door with a color based on the temperature inside the room as detected by sensors from HMDs inside the room) based on a three-dimensional model of the virtual object (e.g., 3D model of a drill) associated with the machine 418 (e.g., a drill). In another example, the rendering module 610 generates a display of the virtual object overlaid on an image of the machine 418 captured by a camera of the head mounted device 406. The virtual object may be further manipulated (e.g., by the user 414) by moving the machine 418 relative to the head mounted device 406. Similarly, the display of the virtual object may be manipulated (e.g., by the user 414) by moving the head mounted device 406 relative to the machine 418.

In another example embodiment, the rendering module 610 includes a local rendering engine that generates a visualization of a three-dimensional virtual object overlaid (e.g., superimposed upon, or otherwise displayed in tandem with) on an image of the machine 418 captured by a camera of the head mounted device 406 or a view of the physical object in the transparent display 614 of the head mounted device 406. A visualization of the three-dimensional virtual object may be manipulated by adjusting a position of the machine 418 (e.g., its physical location, orientation, or both) relative to the camera of the head mounted device 406. Similarly, the visualization of the three-dimensional virtual object may be manipulated by adjusting a position camera of the head mounted device 406 relative to the machine 418.

In one example embodiment, the rendering module 610 identifies the machine 418 (e.g., a physical telephone) based on data from sensors 602 and external sensors 408, accesses virtual functions (e.g., increase or lower the volume of a nearby television) associated with physical manipulations (e.g., lifting a physical telephone handset) of the machine 418, and generates a virtual function corresponding to a physical manipulation of the machine 418.

In another example embodiment, the rendering module 610 determines whether the captured image matches an image locally stored in the storage device 604 that includes a local database of images and corresponding additional information (e.g., three-dimensional model and interactive features). The rendering module 610 retrieves a primary content dataset from the server 402, generates and updates a contextual content dataset based on an image captured with the head mounted device 406.

The tool mapping and localization module 612 generates a virtual object or a visual indicator to be displayed in the transparent display 614. The virtual object may include, for example, a rendered three-dimensional model of a tool (e.g., screwdriver) to be used with the machine 418 in connection with performing a task of the AR application 608. For example, the tool mapping and localization module 612 causes a display of a screw driver perceived as hovering above the machine 418. In another example, the tool mapping and localization module 612 determines that a present tool detected at the head mounted device 406 is an incorrect tool. The tool mapping and localization module 612 causes a display of a virtual cross perceived on top of the incorrect tool.

The storage device 604 stores an identification of the sensors and their respective functions. The storage device 604 further includes a database of visual references (e.g., images, visual identifiers, features of images) and corresponding experiences (e.g., three-dimensional virtual objects, interactive features of the three-dimensional virtual objects). For example, the visual reference may include a machine-readable code or a previously identified image (e.g., a picture of a screwdriver). The previously identified image of the screwdriver may correspond to a three-dimensional virtual model of the screwdriver that can be viewed from different angles by manipulating the position of the head mounted device 406 relative to the picture of the screwdriver. Features of the three-dimensional virtual screwdriver may include selectable icons on the three-dimensional virtual model of the screwdriver. An icon may be selected or activated using a user interface on the head mounted device 406.

In another example embodiment, the storage device 604 includes a primary content dataset, a contextual content dataset, and a visualization content dataset. The primary content dataset includes, for example, a first set of images and corresponding experiences (e.g., interaction with three-dimensional virtual object models). For example, an image may be associated with one or more virtual object models. The primary content dataset may include a core set of images of the most popular images determined by the server 402. The core set of images may include a limited number of images identified by the server 402. For example, the core set of images may include the images depicting covers of the ten most popular machines and their corresponding experiences (e.g., virtual objects that represent the ten most popular machines). In another example, the server 402 may generate the first set of images based on the most popular or often scanned images received at the server 402. Thus, the primary content dataset does not depend on objects or images scanned by the rendering module 610 of the head mounted device 406.

The contextual content dataset includes, for example, a second set of images and corresponding experiences (e.g., three-dimensional virtual object models) retrieved from the server 402. For example, images captured with the head mounted device 406 that are not recognized (e.g., by the server 402) in the primary content dataset are submitted to the server 402 for recognition. If the captured image is recognized by the server 402, a corresponding experience may be downloaded at the head mounted device 406 and stored in the contextual content dataset. Thus, the contextual content dataset relies on the context in which the head mounted device 406 has been used. As such, the contextual content dataset depends on objects or images scanned by the rendering module 610.

In one embodiment, the head mounted device 406 may communicate over the network 428 with the server 402 to retrieve a portion of a database of visual references, corresponding three-dimensional virtual objects, and corresponding interactive features of the three-dimensional virtual objects. The network 428 may be any network that enables communication between or among machines, databases, and devices (e.g., the head mounted device 406). Accordingly, the network 428 may be a wired network, a wireless network (e.g., a mobile or cellular network), or any suitable combination thereof. The network 428 may include one or more portions that constitute a private network, a public network (e.g., the Internet), or any suitable combination thereof.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 7:
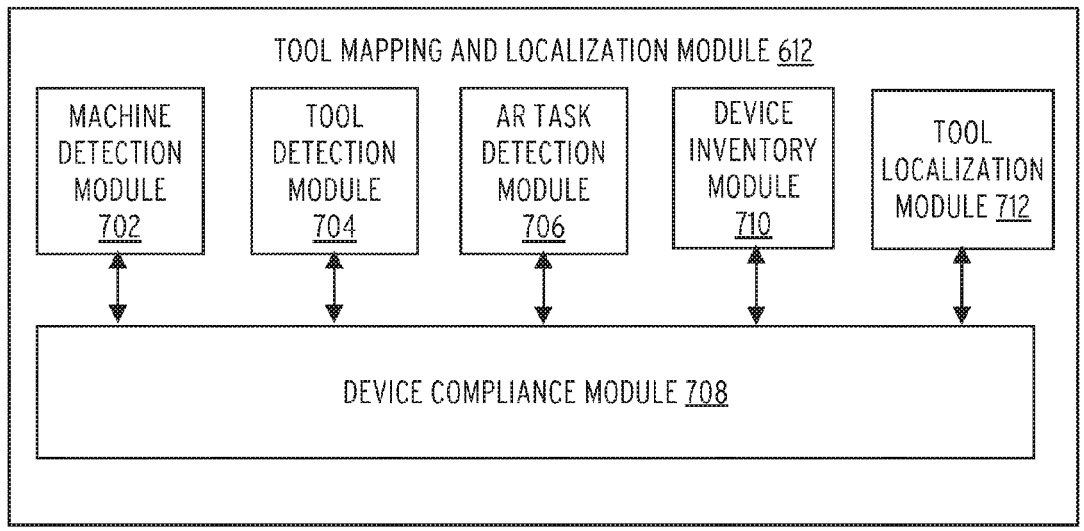
FIG. 7 is a block diagram illustrating an example embodiment of a tool mapping module.

FIG. 7 is a block diagram illustrating an example embodiment of a tool mapping module.

The tool mapping and localization module 612 includes a machine detection module 702, a tool detection module 704, an ar task detection module 706, a device inventory module 710, and a tool localization module 712.

The machine detection module 702 is configured to detect and identify the machine 418 using a combination of techniques such as location of the machine 418, machine-vision to identify the machine 418, other visual and non-visual indicator to uniquely identify the machine 418.

The tool detection module 704 is configured to detect and identify a tool present at the machine 418 and at the head mounted device 406. For example, the tool detection module 704 determines the presence of the tool by using machine-vision technique or using depth sensors to map the physical characteristics of the tool and identify the tool based on the depth sensor data. Other techniques may include determining the shape of the tool to identify the type of tool. The tool detection module 704 may also use visual indicators (e.g., QR code, serial numbers) on the tool to identify the tool.

The ar task detection module 706 determines the task associated with the AR application 608. For example, the task may include cleaning a filter of the machine 418. The task may be selected by the user 414 of the head mounted device 406 or may be assigned to the user 414 by the server 402.

The device inventory module 710 is configured to communicate with the server 402 to access a real time inventory of the tools at the location 410. For example, the device inventory module 710 accesses information generated by the tool detection module 704 and communicate whether a tool is detected and present at the head mounted device 406 to the server 402. In another example, the device inventory module 710 receives inventory data from the server 402 indicating and identifying which tools are present and absent at the dedicated tool board 404, and which head mounted device or user has the missing tool from the dedicated tool board 404. The tool localization module 712 receives inventory data from the server 402 indicating and identifying which tools are present and absent at the dedicated tool board 404. The tool localization module 712 further identifies the location of missing tools from the dedicated tool board 404 based on the inventory data. For example, the tool localization module 712 determines that a hammer is located with the user of the head mounted device 412.

The device compliance module 708 determines whether the tool detected at the head mounted device 412 matches the tool specified or associated with the task at the head mounted device 412. For example, if a task includes changing a filter of a machine x, the tool associated with that task may be a type A wrench. The device compliance module 708 detects that the user of the head mounted device 412 has in his possession a type B wrench instead of the type A wrench and generates AR content within a field of view of the user 422 to warn the user 422 that he/she has the incorrect tool. The AR content may further identify where to find the correct tool within the location 410.

Figure 8:
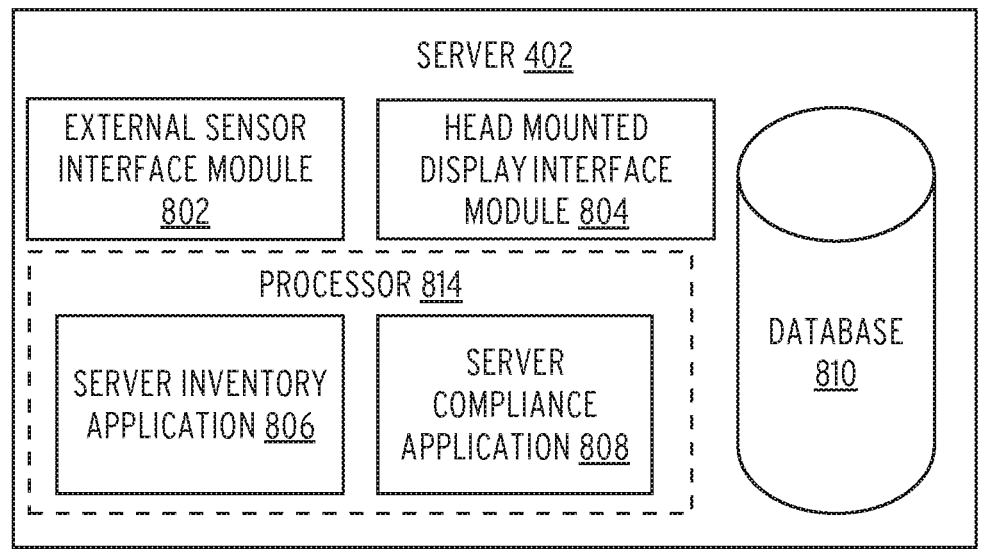
FIG. 8 a block diagram illustrating an example embodiment of a server.

FIG. 8 is a block diagram illustrating an example embodiment of a server. The server 402 includes an external sensor interface module 802, a head mounted display interface module 804, a processor 814, and a database 810.

The external sensor interface module 802 is configured to communicate with the external sensors 408 to receive sensor data related to the head mounted devices, the location 410, and the dedicated tool board 404. For example, the external sensor interface module 802 accesses presence data related to tools on the dedicated tool board 404.

The head mounted display interface module 804 is configured to communicate with the head mounted devices 404, 412, 416 located within the location 410 to receive data identifying a machine and a tool detected at the head mounted device, a task of the AR application in the corresponding head mounted device, a user identification of the head mounted device, and a location of the head mounted device.

The processor 814 includes a server inventory application 806 and a server compliance application 808. The server inventory application 806 performs a real time inventory of the tools based on the data received from the external sensor interface module 802 and the head mounted display interface module 804. For example, the server inventory application 806 tracks the location of each tool from the dedicated tool board 404. The server inventory application 806 associates the identification of each tool with their corresponding location (e.g., screwdriver type B is with head mounted device 412, wrench type C is present on the dedicated tool board 404).

The server compliance application 808 determines a compliance of the head mounted devices based on their respective tasks, location, user identification, tool(s) detected at the corresponding head mounted device. Similarly to device compliance module 708, the server compliance application 808 determines whether the tool detected at each head mounted device matches the tool specified or associated with the task at the corresponding head mounted device. For example, if a task for head mounted device 412 includes changing a filter of a machine x, the tool associated with that task may be a type A wrench. The server compliance application 808 detects that the user of the head mounted device 412 has in his possession a type B wrench instead of the type A wrench and generates AR content within a field of view of the user 422 to warn the user 422 that he/she has the incorrect tool. The AR content may further identify where to find the correct tool (e.g., another user has it, or the tool can be found on the dedicated tool board 404).

The database 810 stores data received from the external sensor interface module 802 and the head mounted display interface module 804, and predefined tools associated with predefined tasks. The database 810 may keep a live inventory of the location of the tools, which tool is associated with which head mounted device, which tool is associated with which task.

Figure 9:
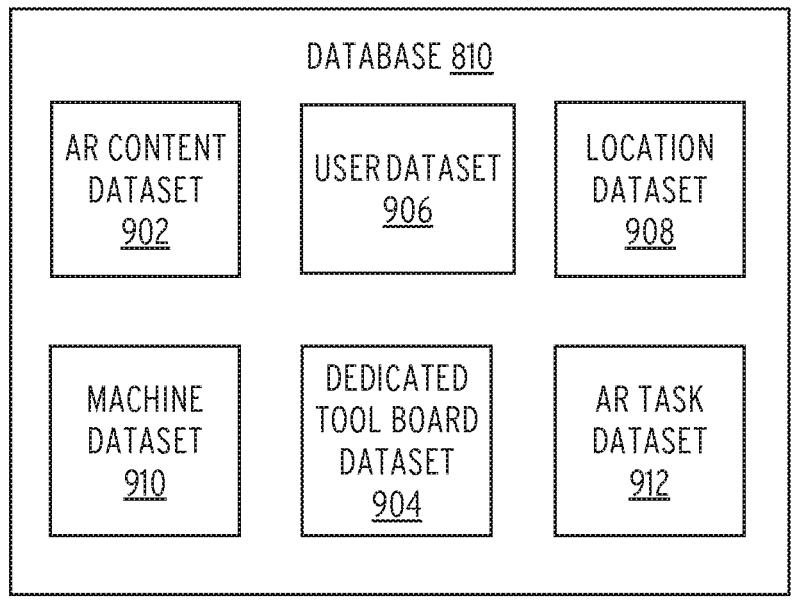
FIG. 9 is a block diagram illustrating an example embodiment of a database.

FIG. 9 is a block diagram illustrating an example embodiment of the database 810. The database 810 includes, for example, an ar content dataset 902, a user dataset 906, a location dataset 908, a machine dataset 910, a dedicated tool board dataset 904, and an ar task dataset 912.

The ar content dataset 902 includes virtual content associated with a task. For example, the virtual content may include an animation of virtual objects illustrating how to change a filter of an engine. The user dataset 906 may include identification data related to the user of the corresponding head mounted device. The location dataset 908 includes data related to a geographical location of the head mounted device, a geographical location of a machine, and a geographical location of a tool. The machine dataset 910 includes data related to the machine (e.g., location, function, operation, make, model, type, image). The dedicated tool board dataset 904 includes data related to the dedicated tool board 404. For example, the data may include the number of tools configured to be stored on the dedicated tool board 404, an identification of which tools are present and absent on the dedicated tool board 404, a location of the tools missing from the dedicated tool board 404. The ar task dataset 912 includes data related to the tasks. For example, each task may be associated with a corresponding set of specific tools.

Figure 10:
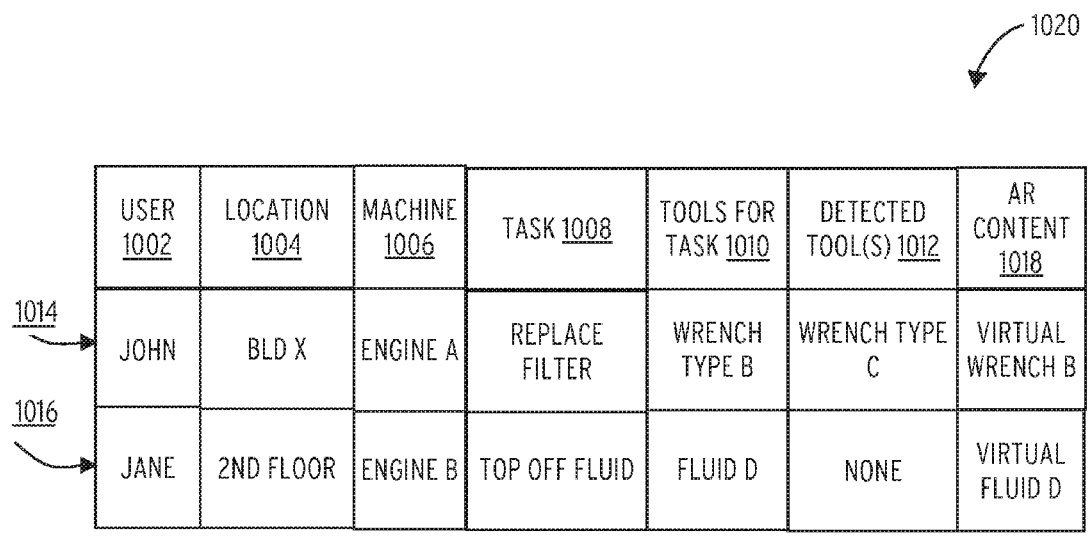
FIG. 10 is a table illustrating an example of a dataset.

FIG. 10 is a table illustrating an example of a table 1020 of a dataset. The table 1020 includes fields for user 1002, location 1004, machine 1006, task 1008, tools for task 1010, detected tool(s) 1012, and ar content 1018. The table 1020 illustrates example entries 1014 and 1016. For example, entries 1014 illustrate an example of a user, John, is located at building x. An engine A is within a field of view of the head mounted device worn by John. John's task as identified in the augmented reality application is to replace a filter. The task requires a specific wrench type B. The head mounted device of John detects that John has the wrench type C (wrench type C is located within a field of view of the head mounted device). At AR content provided to the head mounted device includes a virtual wrench type B. Thus, John may perceive a virtual wrench type B hovering above the engine A to indicate the right type of tool needed to replace the filter of engine A. A visual indicator may be displayed on top of the wrench type C to tell John that the wrench type C is not the correct wrench for the task of replacing the filter of engine A. For example, the visual indicator appears as a virtual cross flashing on top of the wrench type C.

Entries 1016 illustrate an example of a user, Jane located at the 2nd floor of a builder. The head mounted device of Jane detects that the engine B is within a field of view of Jane or Jane is located next to the engine B. The task of Jane as identified in the augmented reality application is to top off fluids with fluid D. The head mounted device of Jane does not detect any fluid around Jane and displays an image or a virtual 3D model of the fluid D for the task of topping off fluids.

Figure 11:
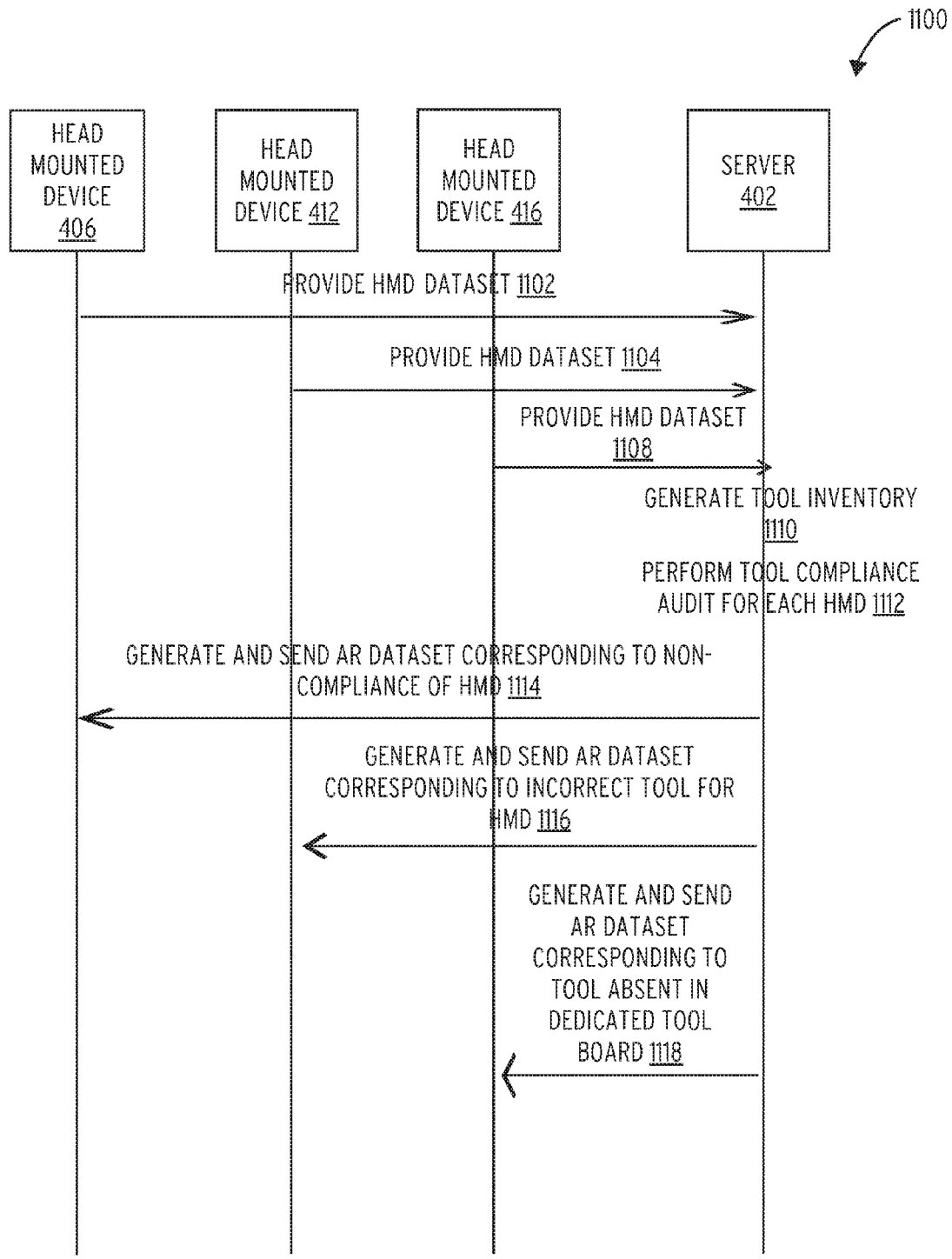
FIG. 11 is an interaction diagram illustrating an example of interactions between head mounted devices and a server.

FIG. 11 is an interaction diagram illustrating an example of interactions between head mounted devices and the server 402. At operation 1102, the head mounted device 406 provides a dataset to the server 402. The dataset includes, for example, sensor data from the head mounted device 406 that identifies a geographic location of the head mounted device 406, the task selected or assigned to the augmented reality application in the head mounted device 406, physical objects detected within a field of view of the head mounted device 406, and the user profile. At operation 1104, the head mounted device 412 provides a dataset related to the machine 420 and the tool 426 visually present within a field of view of the head mounted device 412 to the server 402. At operation 1108, the head mounted device 416 provides a dataset related to the dedicated tool board 404 to the server 402. For example, the dataset from head mounted device 416 includes an identification of which tools are present and missing from the dedicated tool board 404.

At operation 1110, the server 402 generates an inventory of tools based on the datasets received from head mounted device 406, 412, 416. The inventory of tools may identify the location of each tool within the location 410 and the corresponding head mounted device user.

At operation 1112, the server 402 performs a tool compliance audit for each head mounted device based on the inventory of the tools and the dataset for each head mounted device. The tool compliance audit verifies that the tools are located with corresponding task at the head mounted devices.

At operation 1114, the server 402 generates and sends ar content dataset corresponding to non-compliance of the head mounted device 406. For example, the ar content dataset warns the user 414 of the head mounted device 406 that the tools for the task are not detected and present at the head mounted device 406. The ar content dataset may include visual indicators and 3D models of virtual objects to be rendered in the head mounted device 406.

At operation 1116, the server 402 generates and sends ar content dataset corresponding to an incorrect tool at the head mounted device 412. For example, the ar content dataset warns the user 422 of the head mounted device 412 that the detected tool at the head mounted device 412 is not the correct tool for the task. The ar content dataset may include visual indicators and 3D models of virtual objects to be rendered in the head mounted device 412.

At operation 1118, the server 402 generates and sends ar content dataset corresponding to a tool being absent or missing in the dedicated tool board 1614. For example, the ar content dataset includes displaying which user has the tool on the dedicated tool board 404. The ar content dataset may include visual indicators and 3D models of virtual objects to be rendered in the head mounted device 416 pointed at the dedicated tool board 404.

Figure 12:
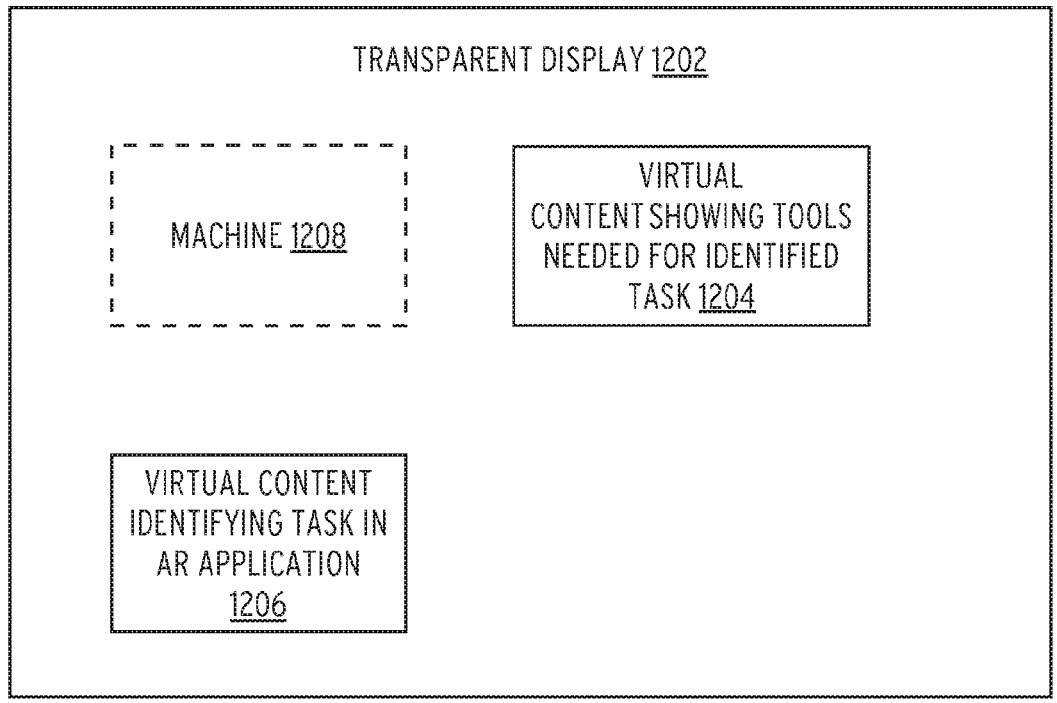
FIG. 12 is a diagram illustrating an example of virtual content displayed in a transparent display of a head mounted device.

FIG. 12 is a diagram illustrating an example of virtual content displayed in a transparent display of a head mounted device.

The transparent display 1202 is aimed at machine 1208. The transparent display 1202 displays virtual content showing tools needed for identified task 1204 (e.g., virtual 3D model of a hammer) and virtual content identifying task in ar application 1206 (e.g., displaying a title or description of the task).

Figure 13:
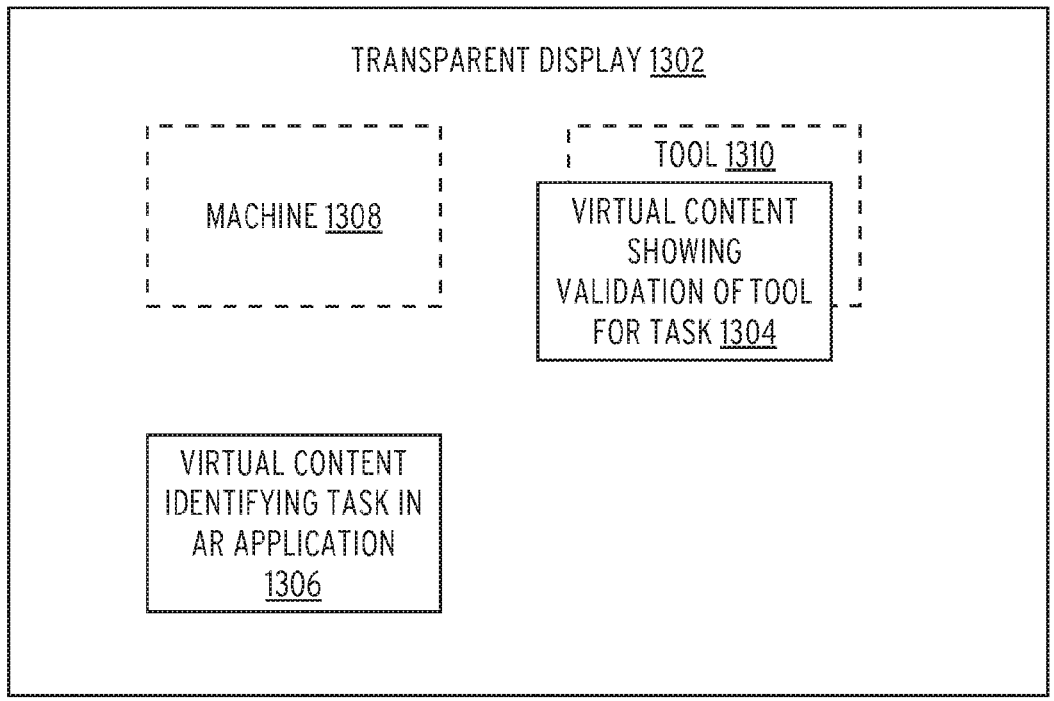
FIG. 13 is a diagram illustrating another example of virtual content displayed in a transparent display of a head mounted device.

FIG. 13 is a diagram illustrating another example of virtual content displayed in a transparent display of a head mounted device.

The transparent display 1302 is aimed at the machine 1308 and the tool 1310. The transparent display 1302 displays a layer of virtual content that includes virtual content showing validation of tool for task 1304 (e.g., green glowing outline or bubble around the tool 1310, a checkmark on the tool 1310) and virtual content identifying task in ar application 1306.

Figure 14:
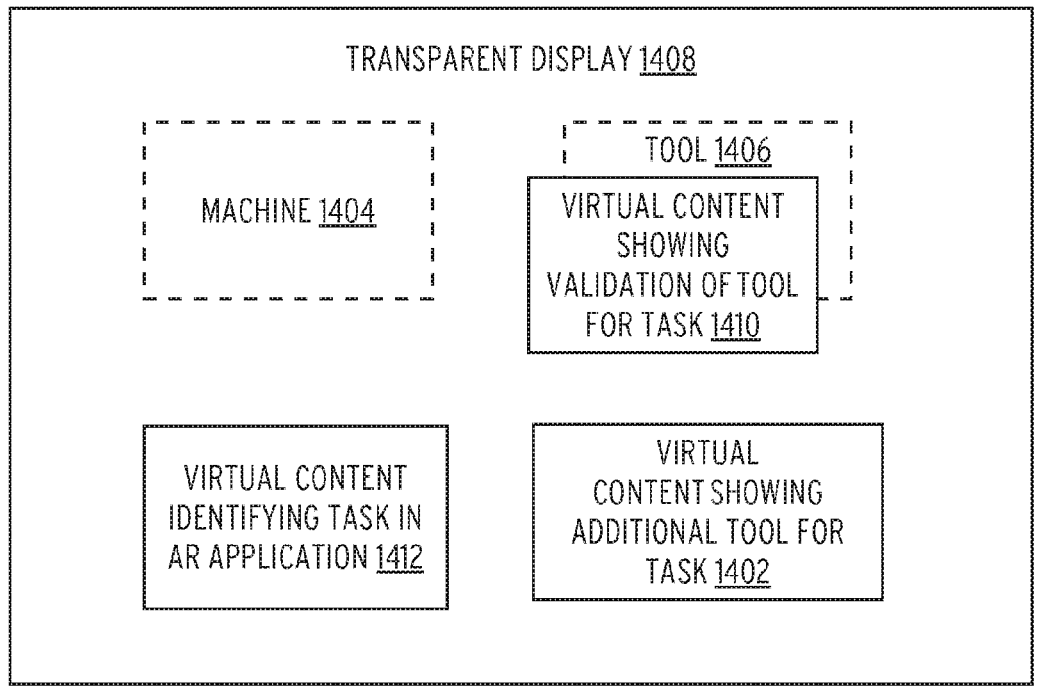
FIG. 14 is a diagram illustrating another example of virtual content displayed in a transparent display of a head mounted device.

FIG. 14 is a diagram illustrating another example of virtual content displayed in a transparent display of a head mounted device.

The transparent display 1408 is aimed at the machine 1404 and the tool 1406. The transparent display 1408 displays a layer of virtual content that includes virtual content showing validation of tool for task 1410, virtual content identifying task in ar application 1412, and virtual content showing additional tool for task 1402 (e.g., 3D model of a screwdriver displayed next to the tool 1406).

Figure 15:
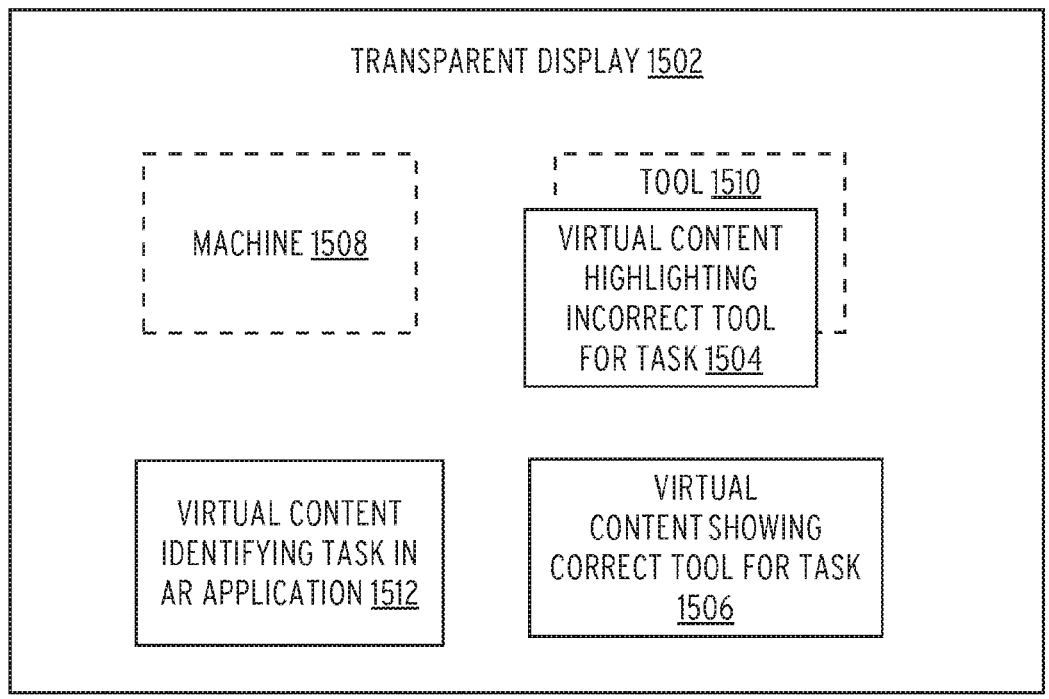
FIG. 15 is a diagram illustrating another example of virtual content displayed in a transparent display of a head mounted device.

FIG. 15 is a diagram illustrating another example of virtual content displayed in a transparent display of a head mounted device.

The transparent display 1502 is aimed at the machine 112 and the tool 128. The transparent display 1502 displays a layer of virtual content that includes virtual content highlighting incorrect tool for task 1504 (e.g., virtual red cross displayed on top of the tool 128), virtual content identifying task in ar application 1306, and virtual content showing correct tool for task 1506.

Figure 16:
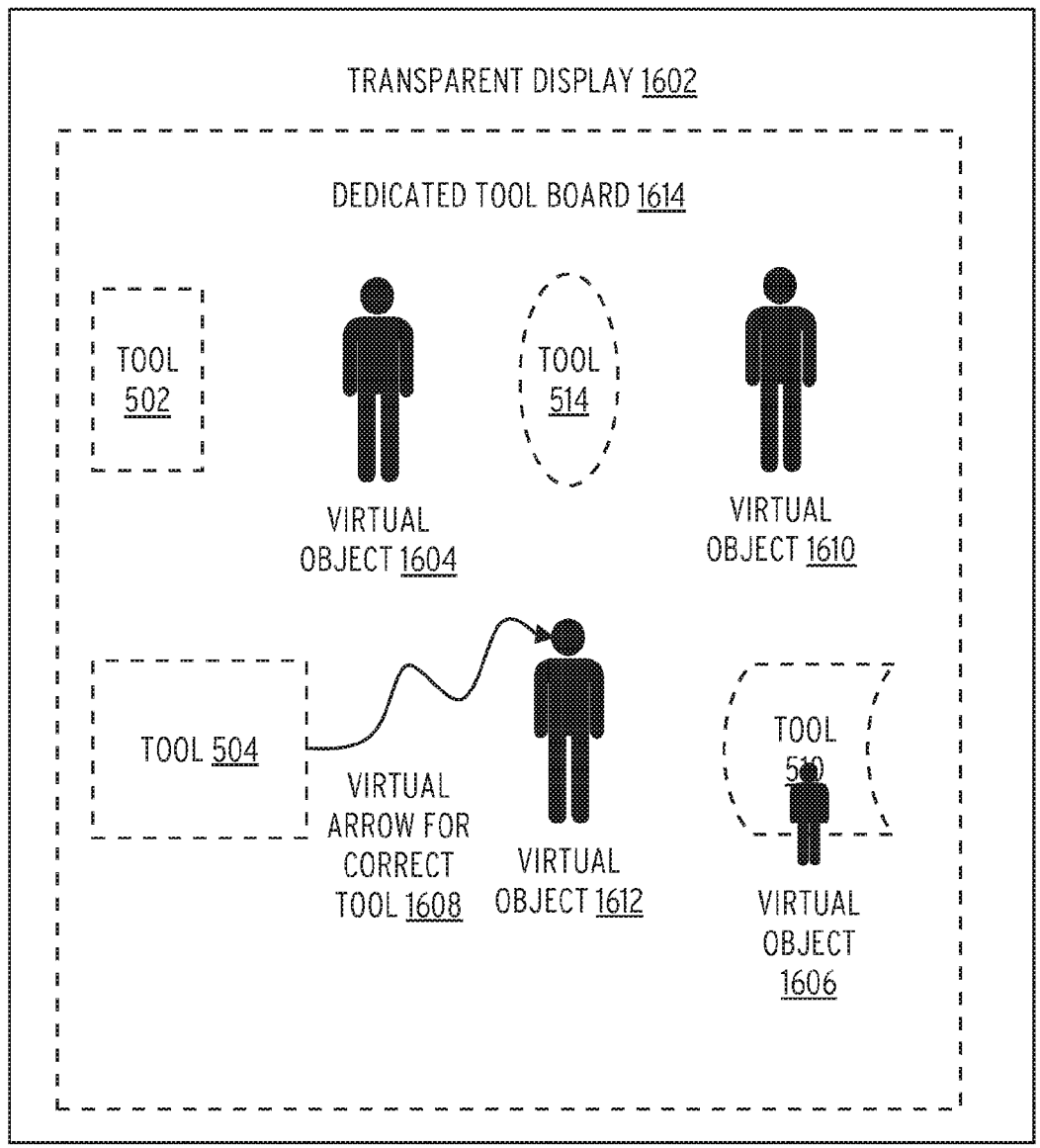
FIG. 16 is a diagram illustrating an example of virtual content displayed in a transparent display of a head mounted device pointed at a dedicated tool board.

FIG. 16 is a diagram illustrating an example of virtual content displayed in a transparent display of a head mounted device pointed at a dedicated tool board.

A transparent display 1602 may be pointed at the dedicated tool board 1614. Tools 502, 514, 504, 510 are present on the dedicated tool board 1614. A layer of virtual objects is displayed in the transparent display 1602. The virtual objects include virtual object 1604, virtual object 1612, virtual object 1610, virtual arrow for correct tool 1608, and virtual object 1606.

The virtual objects 1604, 1610, 1612 are displayed at the predefined locations of the respective tools. For example, virtual object 1604 may include a picture of the user displayed on the location assigned to the tool detected at the head mounted device of the corresponding user. Similarly, virtual object 1610 is displayed at the location on the dedicated tool board 1614 where the corresponding tool is missing.

The virtual object 1612 is displayed on a location assigned to a missing tool. The server 402 detects that the missing tool at the corresponding location on the dedicated tool board 1614 is an incorrect tool and generates a virtual arrow for correct tool 1608 linking the correct tool (e.g., tool 504) to the virtual object 1612 (e.g., picture of the user).

The virtual object 1606 is displayed on top of the tool 510 to identify that the corresponding user does not have the proper tool (tool 510) to perform a task.

Figure 17:
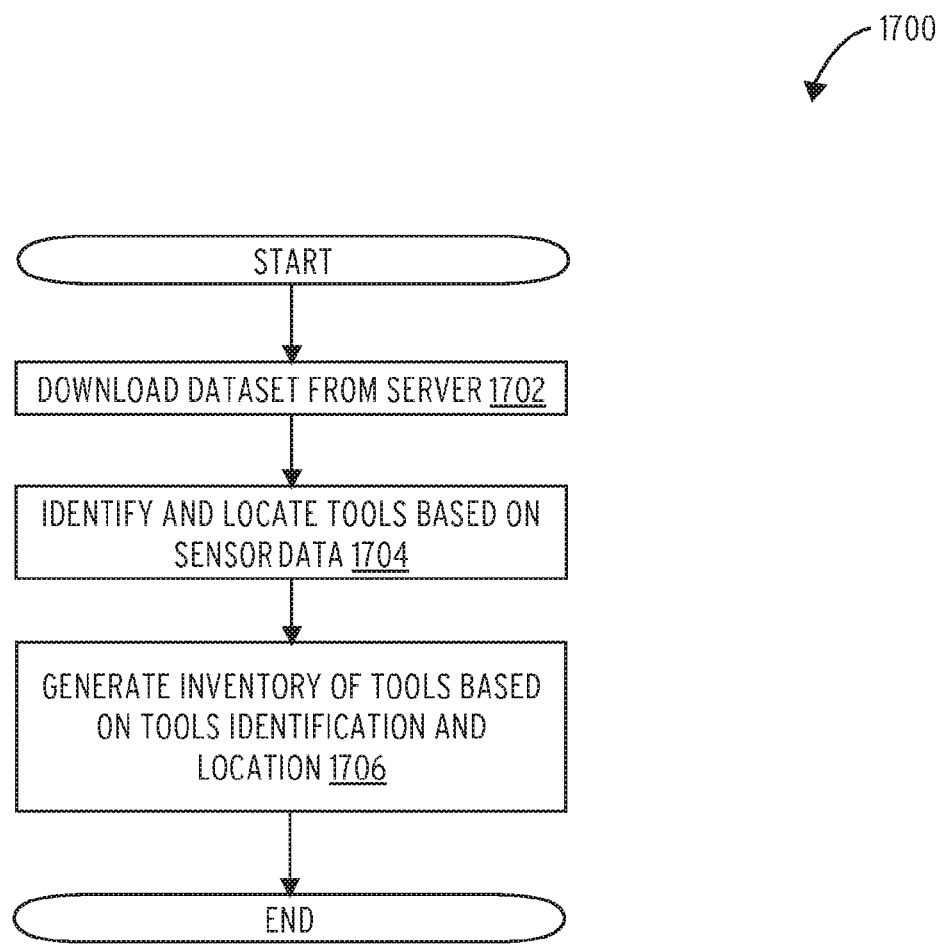
FIG. 17 is a flowchart illustrating an example operation of generating an augmented reality content dataset at a mobile device.

FIG. 17 is a flowchart illustrating an example operation of generating a real time inventory of tools at a mobile device.

At block 1702, the mobile device 104 receives or downloads a dataset from the server 124. In one example embodiment, block 1702 may be implemented with the tool inventory module 212.

At block 1704, the mobile device 104 (passively) identifies and locates tools within the location 102. In one example embodiment, block 1704 may be implemented with the tool recognition module 202 and tool inventory module 212.

At block 1706, the mobile device 104 generates a tool inventory at the location 102 based on data from other mobile devices at the same location 102.

In one example embodiment, block 1704 may be implemented with the tool recognition module 202 and tool inventory module 212.

Figure 18:
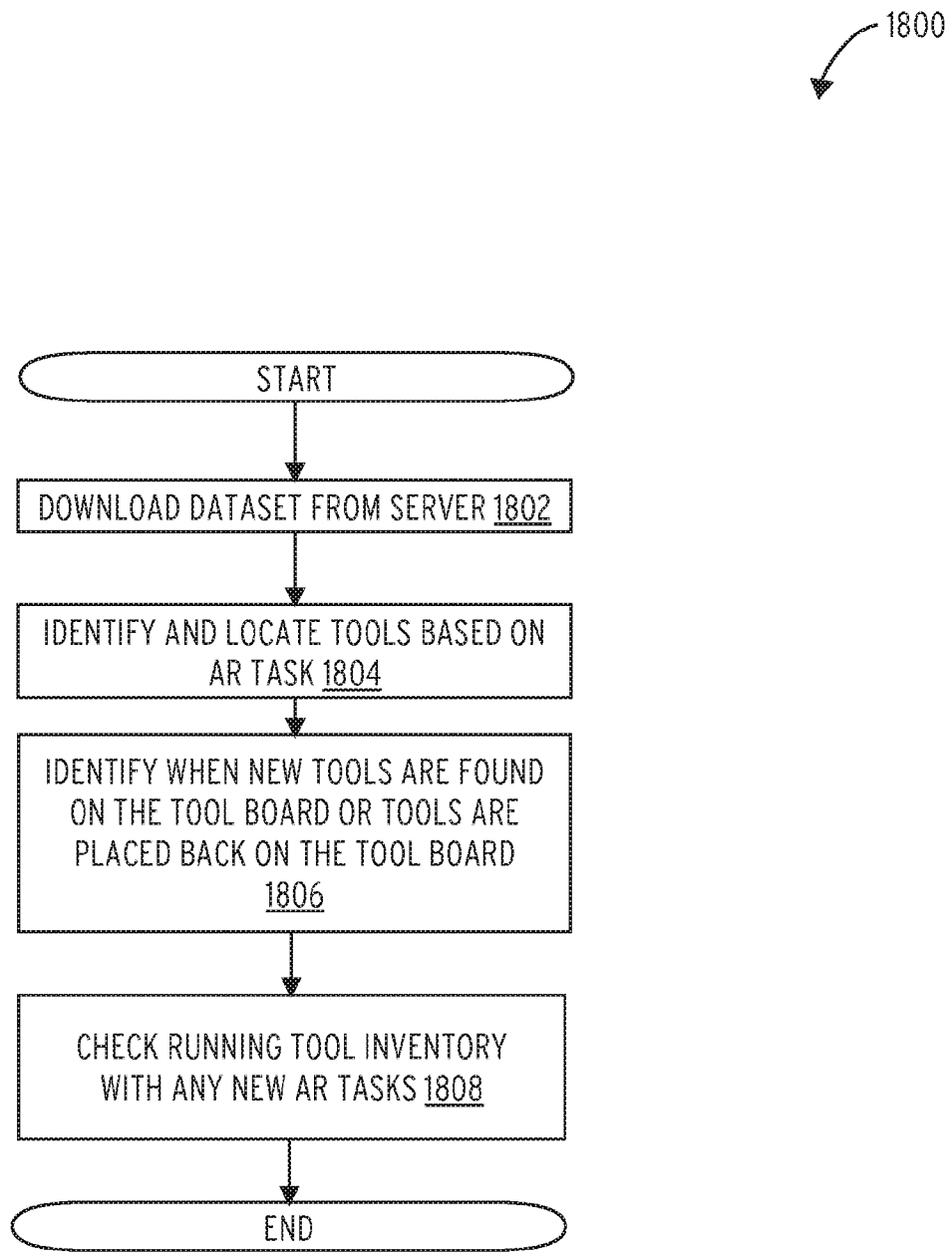
FIG. 18 is a flowchart illustrating an example operation of generating an augmented reality content dataset at a head mounted device.

FIG. 18 is a flowchart illustrating an example operation of generating an augmented reality content dataset at a head mounted device.

At block 1802, the head mounted device 406 receives or downloads a dataset from the server 402. In one example embodiment, block 1902 may be implemented with the tool mapping and localization module 612. In another example, the server 124 may push the ar task dataset 912 to the head mounted device 406.

At block 1804, the head mounted device 406 identifies and locates tools based on the tools specified in a selected ar task (e.g., user-selected or pre-assigned task). In one example embodiment, block 1804 may be implemented with the tool mapping and localization module 612.

At block 1806, the head mounted device 406 identifies when new tools are found on the tool board or tools are placed back on the tool board. In one example embodiment, block 1806 may be implemented with the tool mapping and localization module 612.

At block 1808, the head mounted device 406 checks a running tool inventory with any new ar tasks. In other words, the head mounted device 406 determines which tools are required for a particular ar task. In one example embodiment, block 1808 may be implemented with the head mounted device 406.

Figure 19:
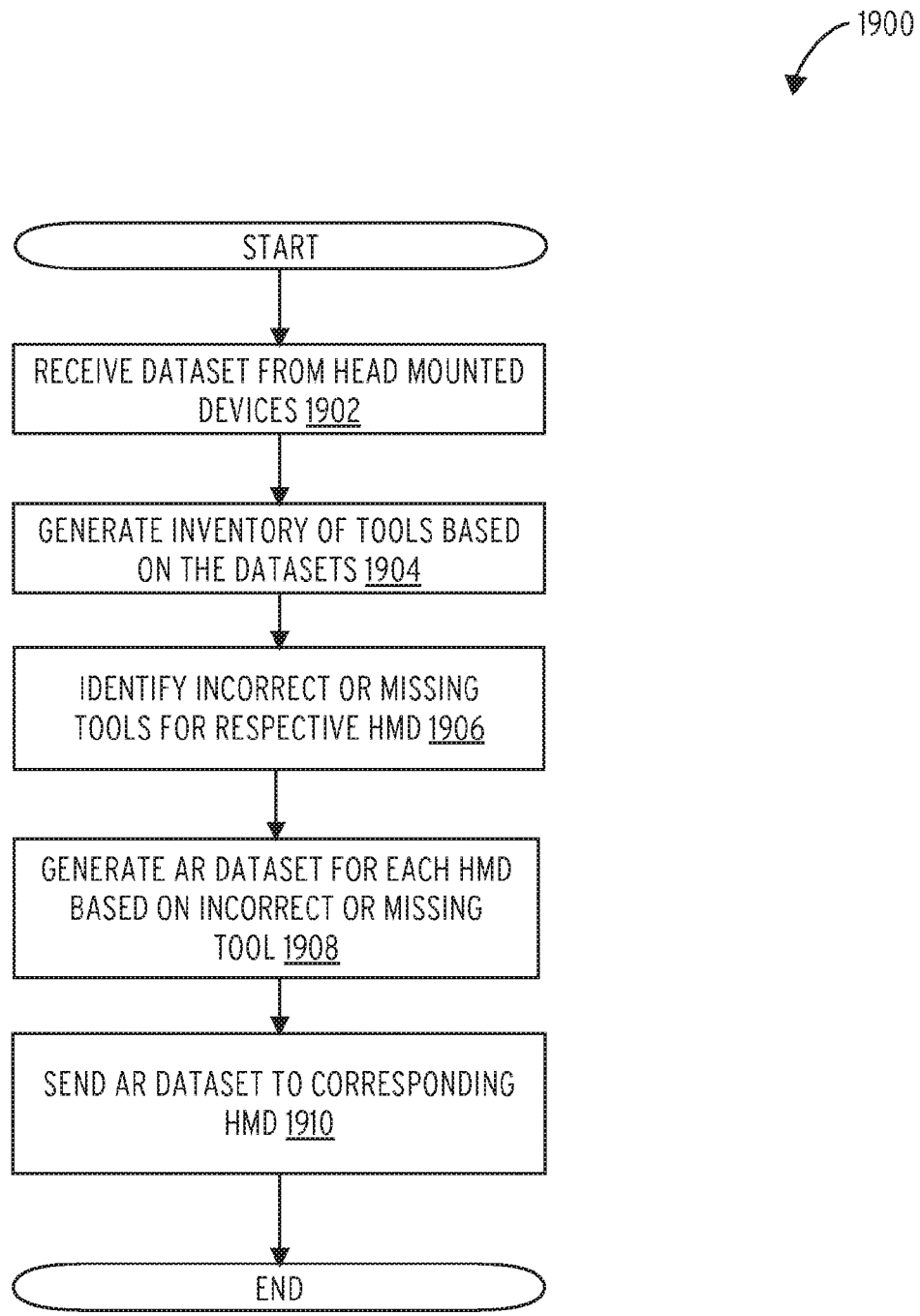
FIG. 19 is a flowchart illustrating an example operation of generating an augmented reality content dataset for a head mounted device at a server.

FIG. 19 is a flowchart illustrating an example operation 1900 of generating an augmented reality content dataset for a head mounted device at the server 402.

At block 1902, the server 402 receives dataset or sensor data from the head mounted devices. In one example embodiment, block 1902 may be implemented with external sensor interface module 802 and head mounted display interface module 804.

At block 1904, the server 402 generates an inventory of the tools based on the datasets received at block 1902. In one example embodiment, block 1904 may be implemented with the server inventory application 806.

At block 1906, the server 402 identifies incorrect and missing tools at the respective head mounted device. In one example embodiment, block 1906 may be implemented with the server compliance application 808.

At block 1908, the server 402 generates an ar dataset for each head mounted device based on the identified incorrect or missing tools. In one example embodiment, block 1908 may be implemented with the server compliance application 808.

At block 1910, the ar dataset is sent to the corresponding head mounted device. In one example embodiment, block 1902 may be implemented with server compliance application 808.

Figure 20:
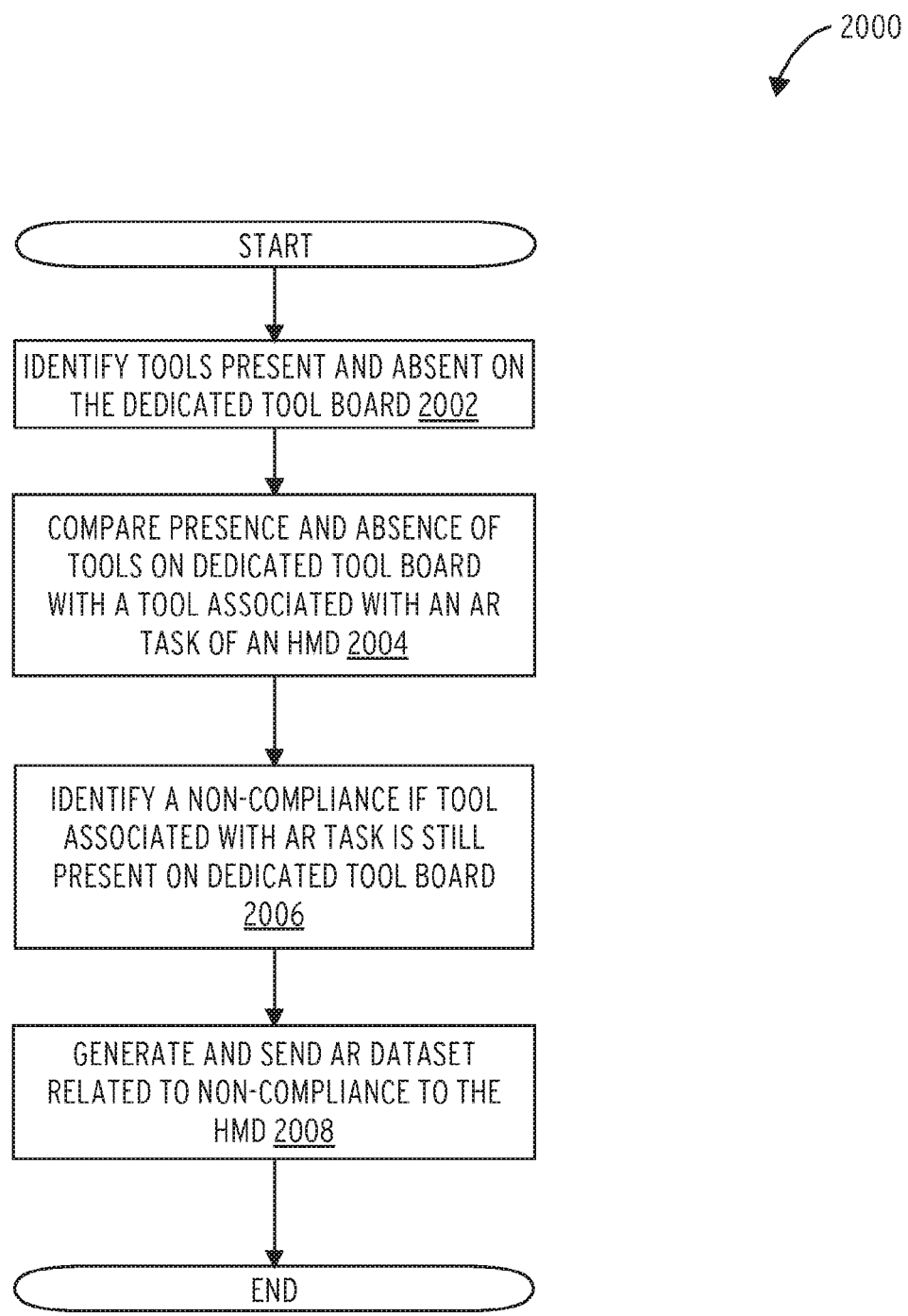
FIG. 20 is a flowchart illustrating an example operation of generating an augmented reality content dataset related to non-compliance for a head mounted device at a server.

FIG. 20 is a flowchart illustrating an example operation of generating an augmented reality content dataset related to non-compliance for a head mounted device.

At block 2002, the server 402 identifies present and absent tools on the dedicated tool board 1614. In one example embodiment, block 2002 may be implemented with the external sensor interface module 802 and the head mounted display interface module 804.

At block 2004, the server 402 compares the present and absent tools with a tool associated with an ar task of a head mounted device. In one example embodiment, block 2004 may be implemented with the server compliance application 808 and the server inventory application 806.

At block 2006, the server 402 identifies a non-compliance if a tool associated with an ar task is still present on the dedicated tool board 1614. In one example embodiment, block 2006 may be implemented with the server compliance application 808.

At block 2008, the server 402 generates an ar dataset representing the non-compliance and sends the ar dataset to the head mounted device. In one example embodiment, block 2008 may be implemented with the server compliance application 808.

Figure 21:
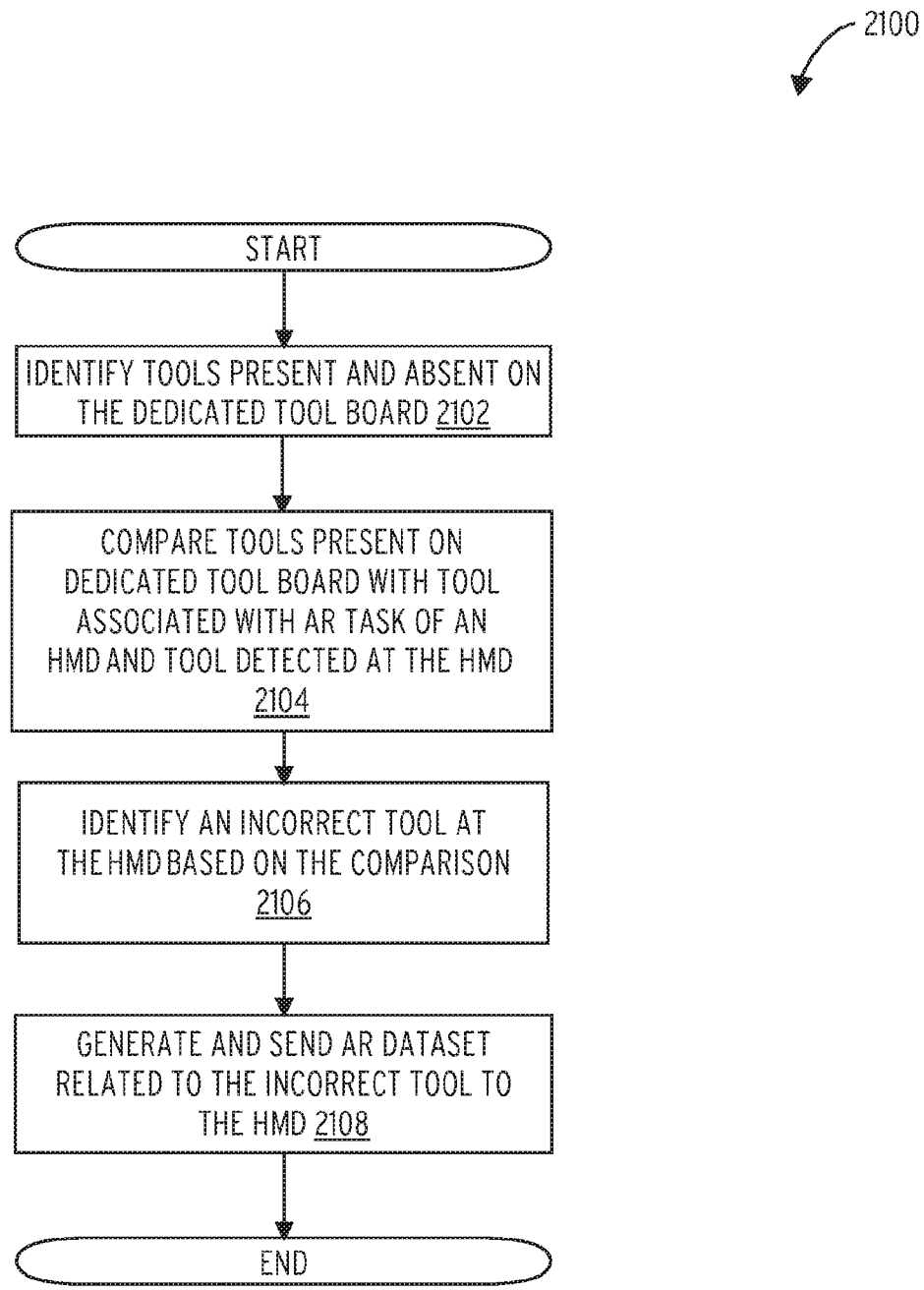
FIG. 21 is a flowchart illustrating an example operation of generating an augmented reality content dataset related to an incorrect tool for a head mounted device at a server.

FIG. 21 is a flowchart illustrating an example operation of generating an augmented reality content dataset related to an incorrect tool for a head mounted device at a server.

At block 2102, the server 402 detects and identifies tools present and absent on the dedicated tool board 1614. In one example embodiment, block 2102 may be implemented with the server inventory application 806.

At block 2104, the server 402 compares tools present on the dedicated tool board 1614 with tools associated with an ar task of a head mounted device and a tool detected at the head mounted device. In one example embodiment, block 2104 may be implemented with the server compliance application 808.

At block 2106, the server 402 identifies an incorrect tool at the head mounted device based on the comparison in block 2104. In one example embodiment, block 2106 may be implemented with the server compliance application 808.

At block 2108, the server 402 generates and sends an ar dataset related to the incorrect tool to the head mounted device. In one example embodiment, block 2108 may be implemented with the server compliance application 808.

Figure 22:
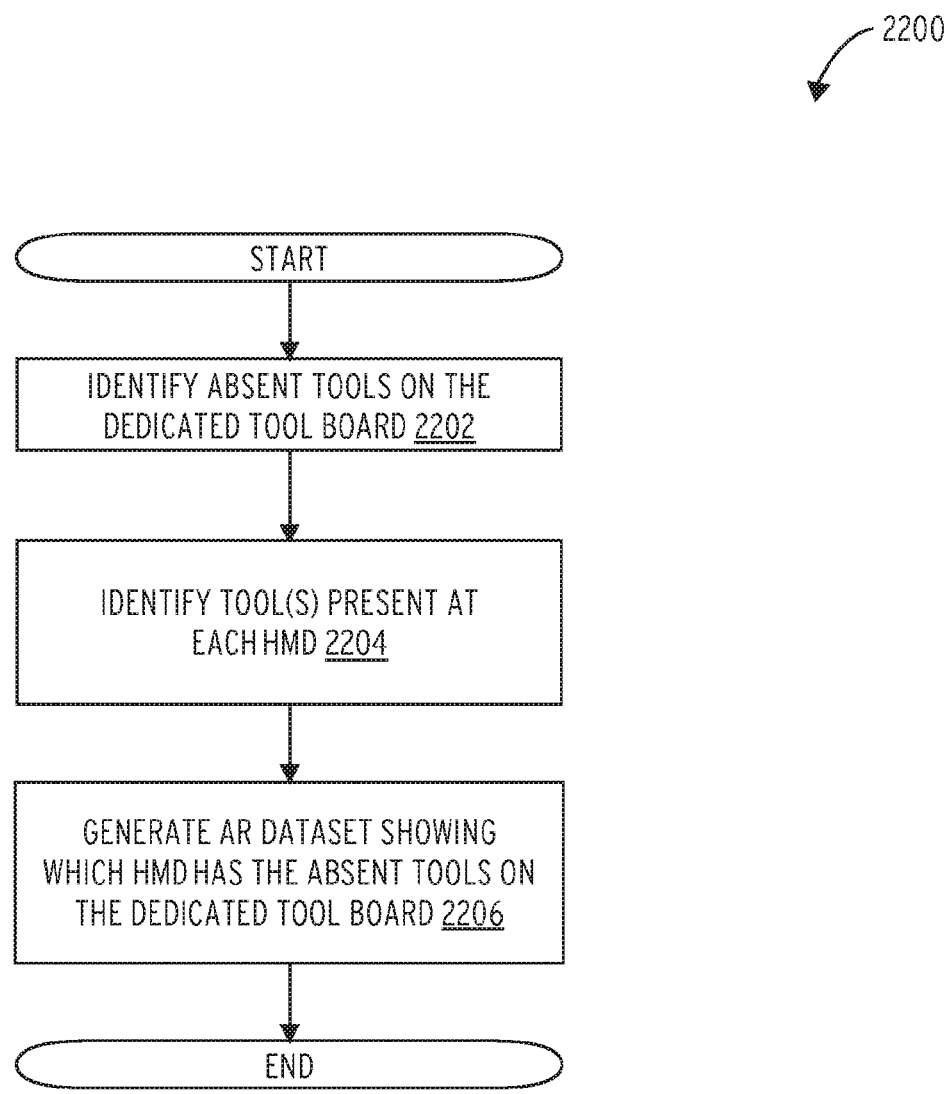
FIG. 22 is a flowchart illustrating an example operation of displaying a visual indicator for alignment in a transparent display of a head mounted device at a server.

FIG. 22 is a flowchart illustrating an example operation 2200 of displaying a visual indicator for alignment in a transparent display of a head mounted device at a server.

At block 2202, the server 402 identifies tools absent from the dedicated tool board 1614. In one example embodiment, block 2202 may be implemented with the external sensor interface module 802, the head mounted display interface module 804, and the server inventory application 806.

At block 2204, the server 402 identifies tools present at the dedicated tool board 1614. In one example embodiment, block 2204 may be implemented with the server inventory application 806.

At block 2206, the server 402 generates an ar dataset to show which head mounted device/user on the dedicated tool board 1614. In one example embodiment, block 2008 may be implemented with the server inventory application 806.

Figure 23:
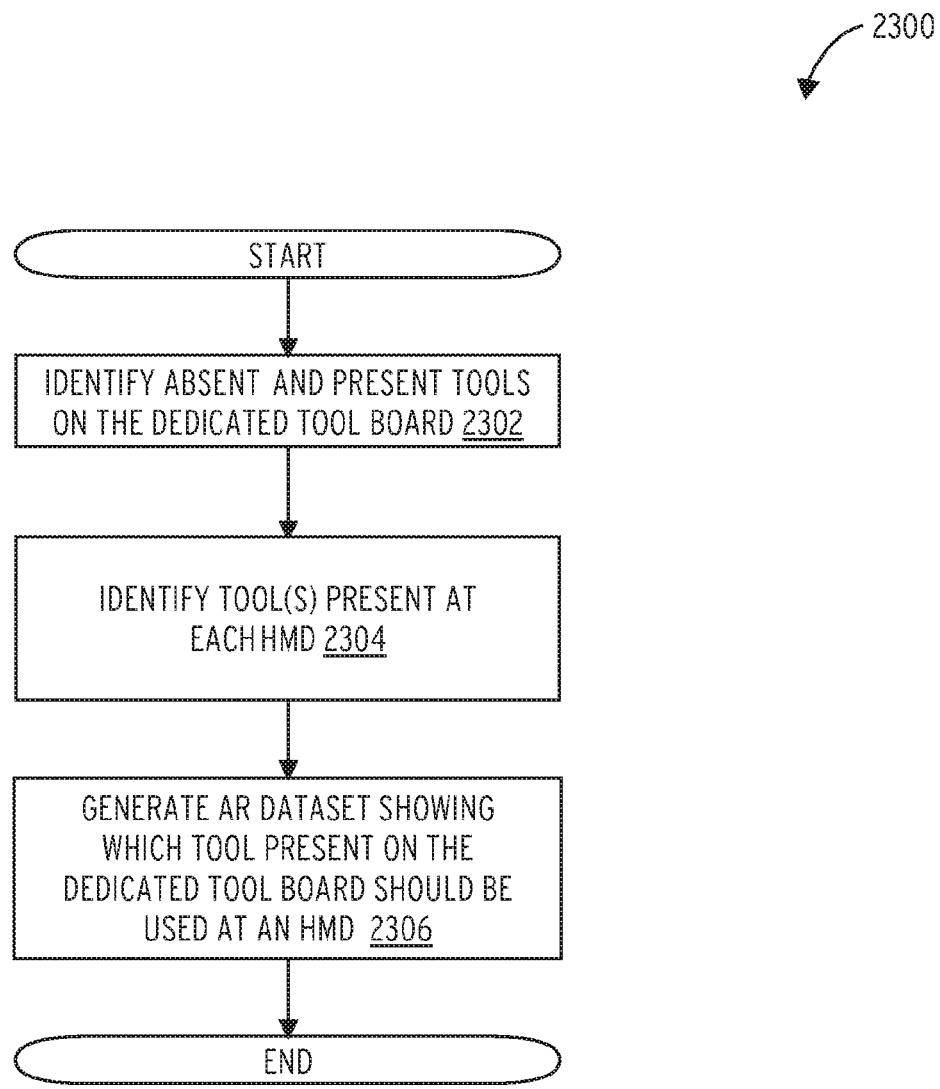
FIG. 23 is a flowchart illustrating an example operation of generating an augmented reality content dataset related to a dedicated tool board at a server.

FIG. 23 is a flowchart illustrating an example operation of generating an augmented reality content dataset related to a dedicated tool board at a server.

At block 2302, the server 402 identifies present and absent tools at the dedicated tool board 1614. In one example embodiment, block 2302 may be implemented with the server inventory application 806.

At block 2304, tools present at each head mounted device are identified. In one example embodiment, block 2304 may be implemented with the server inventory application 806.

At block 2306, an ar dataset showing which tool (that is currently present on the dedicated tool board 1614) should be used at the head mounted device. In one example embodiment, block 2306 may be implemented with the server compliance application 808.

Figure 24:
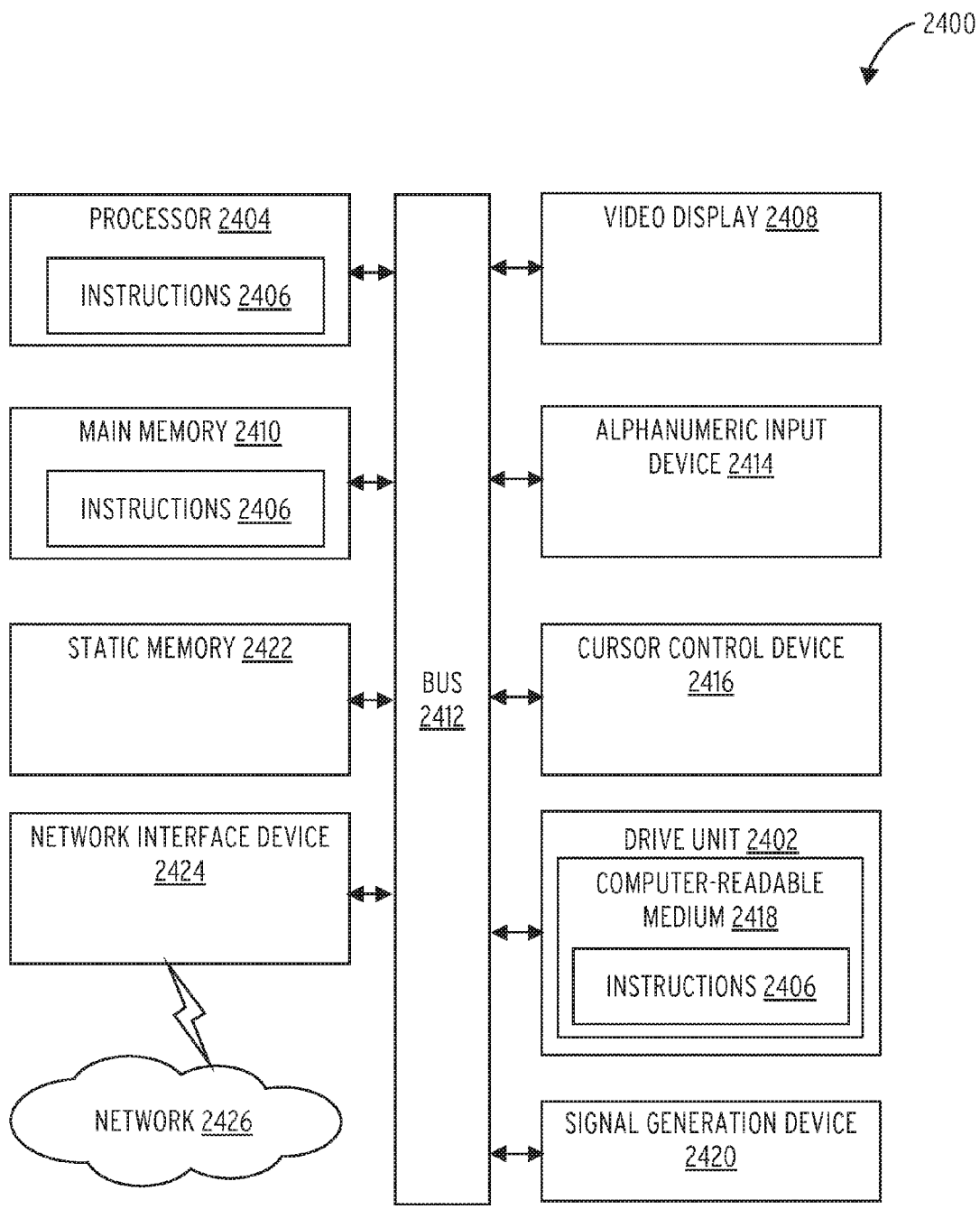
FIG. 24 a block diagram illustrating components of a machine, according to some example embodiments, able to read instructions from a machine-readable medium and perform any one or more of the methodologies discussed herein.

FIG. 24 is a block diagram illustrating components of a machine 2400, according to some example embodiments, able to read instructions 2406 from a computer-readable medium 2418 (e.g., a non-transitory machine-readable medium, a machine-readable storage medium, a computer-readable storage medium, or any suitable combination thereof) and perform any one or more of the methodologies discussed herein, in whole or in part. Specifically, the machine 2400 in the example form of a computer system (e.g., a computer) within which the instructions 2406 (e.g., software, a program, an application, an applet, an app, or other executable code) for causing the machine 2400 to perform any one or more of the methodologies discussed herein may be executed, in whole or in part.

In alternative embodiments, the machine 2400 operates as a standalone device or may be communicatively coupled (e.g., networked) to other machines. In a networked deployment, the machine 2400 may operate in the capacity of a server machine or a client machine in a server-client network environment, or as a peer machine in a distributed (e.g., peer-to-peer) network environment. The machine 2400 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 2406, sequentially or otherwise, that specify actions to be taken by that machine. Further, while only a single machine is illustrated, the term "machine" shall also be taken to include any collection of machines that individually or jointly execute the instructions 2406 to perform all or part of any one or more of the methodologies discussed herein.

The machine 2400 includes a processor 2404 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 2410, and a static memory 2422, which are configured to communicate with each other via a bus 2412. The processor 2404 contains solid-state digital microcircuits (e.g., electronic, optical, or both) that are configurable, temporarily or permanently, by some or all of the instructions 2406 such that the processor 2404 is configurable to perform any one or more of the methodologies described herein, in whole or in part. For example, a set of one or more microcircuits of the processor 2404 may be configurable to execute one or more modules (e.g., software modules) described herein. In some example embodiments, the processor 2404 is a multicore CPU (e.g., a dual-core CPU, a quad-core CPU, or a 128-core CPU) within which each of multiple cores behaves as a separate processor that is able to perform any one or more of the methodologies discussed herein, in whole or in part. Although the beneficial effects described herein may be provided by the machine 2400 with at least the processor 2404, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 2400 may further include a video display 2408 (e.g., a plasma display panel (PDP), a light emitting diode (LED) display, a liquid crystal display (LCD), a projector, a cathode ray tube (CRT), or any other display capable of displaying graphics or video). The machine 2400 may also include an alphanumeric input device 2414 (e.g., a keyboard or keypad), a cursor control device 2416 (e.g., a mouse, a touchpad, a trackball, a joystick, a motion sensor, an eye tracking device, or other pointing instrument), a drive unit 2402, a signal generation device 2420 (e.g., a sound card, an amplifier, a speaker, a headphone jack, or any suitable combination thereof), and a network interface device 2424.

The drive unit 2402 (e.g., a data storage device) includes the computer-readable medium 2418 (e.g., a tangible and non-transitory machine-readable storage medium) on which are stored the instructions 2406 embodying any one or more of the methodologies or functions described herein. The instructions 2406 may also reside, completely or at least partially, within the main memory 2410, within the processor 2404 (e.g., within the processor's cache memory), or both, before or during execution thereof by the machine 2400. Accordingly, the main memory 2410 and the processor 2404 may be considered machine-readable media (e.g., tangible and non-transitory machine-readable media). The instructions 2406 may be transmitted or received over a computer network via the network interface device 2424. For example, the network interface device 2424 may communicate the instructions 2406 using any one or more transfer protocols (e.g., hypertext transfer protocol (HTTP)).

In some example embodiments, the machine 2400 may be a portable computing device (e.g., a smart phone, tablet computer, or a wearable device), and have one or more additional input components (e.g., sensors or gauges). Examples of such input components include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a biometric input component (e.g., a heartrate detector or a blood pressure detector), and a gas detection component (e.g., a gas sensor). Input data gathered by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the computer-readable medium 2418 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 2406 for execution by the machine 2400, such that the instructions 2406, when executed by one or more processors of the machine 2400 (e.g., processor 2404), cause the machine 2400 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 2406 for execution by the machine 2400 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 2406).

What is claimed is:

1. A method comprising:
    receiving, at a server, sensor data from a plurality of mobile devices having optical sensors and location sensors, the sensor data identifying a mobile physical object and a location of the mobile physical object within a predefined geographic region based on the optical and location sensors;
    identifying mobile physical objects that are present and absent within the predefined geographic region based on a predefined catalog of the mobile physical objects at the predefined geographic region;
    generating, at the server, a real-time inventory of the mobile physical objects at the predefined geographic region based on the mobile physical objects that are present and absent within the predefined geographic region, the real-time inventory including the identification of the mobile physical objects and the location of the mobile physical objects within the geographic region;
    receiving datasets from the plurality of mobile devices, each dataset identifying a task selected in an augmented reality application of a corresponding mobile device, an identification of a physical tool detected at the corresponding mobile device, each mobile device including a display device;
    identifying physical tools present and absent at a dedicated tool board, the dedicated tool board configured to store the physical tools for the tasks of the augmented reality application;
    comparing an identification of the physical tools present and absent at the dedicated tool board with the physical tools detected at the mobile devices and the tasks identified at the mobile devices to generate a tool inventory and a tool compliance, the tool inventory identifying physical tools absent from the dedicated tool board and detected at the corresponding mobile device, the tool compliance identifying whether the physical tool detected at the corresponding mobile device is valid for the task selected in the augmented reality application of the corresponding mobile device;
    generating an augmented reality content dataset for each mobile device, each augmented reality content dataset comprising a virtual object identifying at least one of a missing physical tool, an incorrect physical tool, and a valid physical tool based on the tool compliance; and
    generating a dedicated tool board augmented reality content dataset for the dedicated tool board based on the tool inventory, the dedicated tool board augmented reality content dataset comprising a plurality of virtual objects identifying users of the mobile devices with corresponding physical tools on the dedicated tool board.

2. The method of claim 1, wherein the dataset further comprises an identification of a user for each mobile device, an identification and a location of the physical object within a field of view of each mobile device, the task identifying a physical operation to perform on the physical object, the augmented reality application configured to generate virtual objects displayed in a transparent display of the corresponding mobile device, the virtual objects including a visual illustration of how to perform the task and how operate the physical tool related to the task on the physical object, wherein the method further comprises:
    identifying dataset relevant to a corresponding mobile device and updating a local recognition content dataset at the corresponding mobile device with the relevant dataset.

3. The method of claim 1, wherein the dedicated tool board includes a plurality of tool identifiers, the plurality of tool identifiers including a plurality of outlines displayed on the dedicated tool board, each outline corresponding to a physical tool on the dedicated tool board, each tool identifier generated for computer vision identification.

4. The method of claim 1, further comprising:
    using a depth sensor of a mobile device with the dedicated tool board within a field of view of the mobile device, to determine the physical tools present at the dedicated tool board; and
    identifying physical tools absent from the dedicated tool board based depth sensor data, a shape of an outline, and a location of the outline relative to the dedicated tool board.

5. The method of claim 1, wherein the virtual object includes a three-dimensional model of a physical tool related to the task selected at the corresponding mobile device.

6. The method of claim 1, wherein the virtual object includes a first visual indicator to validate a first physical tool detected at the corresponding mobile device for the task selected at the corresponding mobile device.

7. The method of claim 1, wherein the virtual object includes a second visual indicator to identify the second physical tool detected at the corresponding mobile device as an incorrect physical tool for the task selected at the corresponding mobile device.

8. The method of claim 1, wherein the dedicated tool board augmented reality content dataset comprises at least one of:
   a first virtual object identifying a user of a mobile device corresponding to a physical tool absent from the dedicated tool board;
   a second virtual object comprising a visual indicator linking a physical tool present on the dedicated tool board to the first virtual object;
   a third virtual object identifying a user of a mobile device corresponding to a physical tool present on the dedicated tool board; and
   a fourth virtual object comprising a visual indicator of a current location of a physical tool absent from the dedicated tool board.

9. The method of claim 1, further comprising:
   communicating the augmented reality content dataset to the corresponding mobile device;
   causing a display of the augmented reality content dataset in a transparent display of the corresponding mobile device;
   communicating the dedicated tool board augmented reality content dataset to a mobile device with the dedicated tool board within a field of view of the mobile device; and
   causing the display of the dedicated tool board augmented reality content dataset in the transparent display of the mobile device with the dedicated tool board within the field of view of the mobile device.

10. A server comprising:
   a processor; and
   a memory storing instructions that, when executed by the processor, configure the server to:
      receive sensor data from a plurality of mobile devices having optical sensors and location sensors, the sensor data identifying a mobile physical object and a location of the mobile physical object within a predefined geographic region based on the optical and location sensors;
      identify mobile physical objects that are present and absent within the predefined geographic region based on a predefined catalog of the mobile physical objects at the predefined geographic region;
      generate a real-time inventory of the mobile physical objects at the predefined predefined geographic region based on the mobile physical objects that are present and absent within the predefined geographic region, the real-time inventory including the identification of the mobile physical objects and the location of the mobile physical objects within the predefined predefined geographic region;
      receive datasets from the plurality of mobile devices, each dataset identifying a task selected in an augmented reality application of a corresponding mobile device, an identification of a physical tool detected at the corresponding mobile device, each mobile device including a display device;
      identify physical tools present and absent at a dedicated tool board, the dedicated tool board configured to store the physical tools for the tasks of the augmented reality application;
      compare an identification of the physical tools present and absent at the dedicated tool board with the physical tools detected at the mobile devices and the tasks identified at the mobile devices to generate a tool inventory and a tool compliance, the tool inventory identifying physical tools absent from the dedicated tool board and detected at the corresponding mobile device, the tool compliance identifying whether the physical tool detected at the corresponding mobile device is valid for the task selected in the augmented reality application of the corresponding mobile device;
      generate an augmented reality content dataset for each mobile device, each augmented reality content dataset comprising a virtual object identifying at least one of a missing physical tool, an incorrect physical tool, and a valid physical tool based on the tool compliance; and
      generate a dedicated tool board augmented reality content dataset for the dedicated tool board based on the tool inventory, the dedicated tool board augmented reality content dataset comprising a plurality of virtual objects identifying users of the mobile devices with corresponding physical tools on the dedicated tool board.

11. The server of claim 10, wherein the dataset further comprises an identification of a user for each mobile device, an identification and a location of the physical object within a field of view of each mobile device,
   the task identify a physical operation to perform on the physical object,
   the augmented reality application configured to generate virtual objects displayed in a transparent display of the corresponding mobile device, the virtual objects include a visual illustration of how to perform the task and how operate the physical tool related to the task on the physical object.

12. The server of claim 10, wherein the dedicated tool board includes a plurality of tool identifiers, the plurality of tool identifiers include a plurality of outlines displayed on the dedicated tool board, each outline corresponding to a physical tool on the dedicated tool board, each tool identifier generated for computer vision identification.

13. The server of claim 10, wherein the instructions further configure the server to:
   using a depth sensor of a mobile device with the dedicated tool board within a field of view of the mobile device, to determine the physical tools present at the dedicated tool board; and
   identify physical tools absent from the dedicated tool board based depth sensor data, a shape of an outline, and a location of the outline relative to the dedicated tool board.

14. The server of claim 10, wherein the virtual object includes a three-dimensional model of a physical tool related to the task selected at the corresponding mobile device.

15. The server of claim 10, wherein the virtual object includes a first visual indicator to validate a first physical tool detected at the corresponding mobile device for the task selected at the corresponding mobile device, and a second a visual indicator to identify a second physical tool detected at the corresponding mobile device as an incorrect physical tool for the task selected at the corresponding mobile device.

16. The server of claim 10, wherein the dedicated tool board augmented reality content dataset comprises at least one of:
- a first virtual object identify a user of a mobile device corresponding to a physical tool absent from the dedicated tool board;
- a second virtual object comprising a visual indicator link a physical tool present on the dedicated tool board to the first virtual object;
- a third virtual object identify a user of a mobile device corresponding to a physical tool present on the dedicated tool board; and
- a fourth virtual object comprising a visual indicator of a current location of a physical tool absent from the dedicated tool board.

17. The server of claim 10, wherein the instructions further configure the server to:
- communicate the augmented reality content dataset to the corresponding mobile device;
- cause a display of the augmented reality content dataset in a transparent display of the corresponding mobile device;
- communicate the dedicated tool board augmented reality content dataset to a mobile device with the dedicated tool board within a field of view of the mobile device; and
- cause the display of the dedicated tool board augmented reality content dataset in the transparent display of the mobile device with the dedicated tool board within the field of view of the mobile device.

18. A non-transitory computer-readable storage medium, the computer-readable storage medium including instructions that when executed by a computer, cause the computer to:
- receive sensor data from a plurality of mobile devices having optical sensors and location sensors, the sensor data identifying a mobile physical object and a location of the mobile physical object within a predefined geographic region based on the optical and location sensors;
- identify mobile physical objects that are present and absent within the predefined geographic region based on a predefined catalog of the mobile physical objects at the predefined geographic region;
- generate a real-time inventory of the mobile physical objects at the predefined geographic region based on the mobile physical objects that are present and absent within the predefined geographic region, the real-time inventory including the identification of the mobile physical objects and the location of the mobile physical objects within the predefined geographic region;
- receive datasets from the plurality of mobile devices, each dataset identifying a task selected in an augmented reality application of a corresponding mobile device, an identification of a physical tool detected at the corresponding mobile device, each mobile device including a display device;
- identify physical tools present and absent at a dedicated tool board, the dedicated tool board configured to store the physical tools for the tasks of the augmented reality application;
- compare an identification of the physical tools present and absent at the dedicated tool board with the physical tools detected at the mobile devices and the tasks identified at the mobile devices to generate a tool inventory and a tool compliance, the tool inventory identifying physical tools absent from the dedicated tool board and detected at the corresponding mobile device, the tool compliance identifying whether the physical tool detected at the corresponding mobile device is valid for the task selected in the augmented reality application of the corresponding mobile device;
- generate an augmented reality content dataset for each mobile device, each augmented reality content dataset comprising a virtual object identifying at least one of a missing physical tool, an incorrect physical tool, and a valid physical tool based on the tool compliance; and
- generate a dedicated tool board augmented reality content dataset for the dedicated tool board based on the tool inventory, the dedicated tool board augmented reality content dataset comprising a plurality of virtual objects identifying users of the mobile devices with corresponding physical tools on the dedicated tool board.

* * * * *

UNITED STATES PATENT AND TRADEMARK OFFICE
CERTIFICATE OF CORRECTION

PATENT NO. : 9,824,437 B2  
APPLICATION NO. : 14/966666  
DATED : November 21, 2017  
INVENTOR(S) : Brian Mullins Page 1 of 1

It is certified that error appears in the above-identified patent and that said Letters Patent is hereby corrected as shown below:

In the Claims

In Column 29, Line 55, in Claim 10, after "the", delete "predefined"

In Column 29, Lines 60-61, in Claim 10, after "the", delete "predefined"

Signed and Sealed this  
Eleventh Day of June, 2019

Andrei Iancu  
*Director of the United States Patent and Trademark Office*